United States Patent
Uemura et al.

(10) Patent No.: US 11,375,043 B2
(45) Date of Patent: Jun. 28, 2022

(54) PROGRAM MANAGEMENT SYSTEM, EXTERNAL DEVICE AND TERMINAL DEVICE FOR CONTROLLING A PROGRAM DEVELOPER'S ABILITY TO ACCESS, PUBLISH AND MANAGE MARKETING OF A PROGRAM

(71) Applicant: CITIZEN WATCH CO., LTD., Tokyo (JP)

(72) Inventors: Ryutaro Uemura, Tokyo (JP); Daisuke Matsuoh, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 16/809,165

(22) Filed: Mar. 4, 2020

(65) Prior Publication Data

US 2020/0287989 A1    Sep. 10, 2020

(30) Foreign Application Priority Data

Mar. 6, 2019 (JP) .............................. JP2019-040300
Jan. 29, 2020 (JP) .............................. JP2020-012311

(51) Int. Cl.
*H04L 67/63* (2022.01)
*H04L 67/025* (2022.01)
*H04L 67/00* (2022.01)

(52) U.S. Cl.
CPC .......... *H04L 67/327* (2013.01); *H04L 67/025* (2013.01); *H04L 67/34* (2013.01)

(58) Field of Classification Search
CPC ..... H04L 67/327; H04L 67/025; H04L 67/34; H04W 4/50
See application file for complete search history.

(56) References Cited

U.S. PATENT DOCUMENTS 7,865,952 B1 *  1/2011  Hopwood ........... H04L 63/1433
                                                            726/22
8,555,273 B1 * 10/2013  Chia .................... G06F 8/654
                                                            717/172

(Continued)

FOREIGN PATENT DOCUMENTS

JP    2002-091850 A    3/2002
JP    2010-033373 A    2/2010

(Continued)

OTHER PUBLICATIONS

Genchiro Ohashi et al., "Innermost Secrets for Automation of Personal Computers", Nikkei Business Publications, Inc, No. 708, Oct. 27, 2014, pp. 26-55 (33 Pages Total).

(Continued)

*Primary Examiner* — Jimmy H Tran
(74) *Attorney, Agent, or Firm* — Sughrue Mion, PLLC

(57) ABSTRACT

A program management system includes: a terminal device having a terminal processing unit capable of executing processing to create a computer program, and a terminal communication unit capable of transmitting the computer program created by the terminal processing unit to an outside; and an external device having an external device storage unit storing therein the computer program transmitted from the terminal device, and an external device processing unit capable of executing processing to give approval to the computer program stored in the external device storage unit. The external device storage unit stores therein appropriateness of approval of the computer program as first status information together with the computer program. The external device processing unit is capable of executing processing to manage the computer program based on the first status information.

15 Claims, 15 Drawing Sheets

(56) References Cited

U.S. PATENT DOCUMENTS

| | | | |
|---|---|---|---|
| 10,318,119 B2* | 6/2019 | Lemay | G06F 9/453 |
| 2007/0174888 A1* | 7/2007 | Rubinstein | H04N 21/26216 |
| | | | 725/115 |
| 2009/0276433 A1* | 11/2009 | Fosback | G06Q 30/0603 |
| 2010/0017505 A1 | 1/2010 | Kamada et al. | |
| 2010/0299219 A1* | 11/2010 | Cortes | G06F 9/445 |
| | | | 705/26.35 |
| 2011/0010759 A1* | 1/2011 | Adler | G06F 21/10 |
| | | | 726/4 |
| 2011/0055153 A1 | 3/2011 | Hashimoto et al. | |
| 2011/0145932 A1* | 6/2011 | Nerger | H04L 67/125 |
| | | | 726/29 |
| 2011/0289499 A1* | 11/2011 | Haubold | G06F 8/65 |
| | | | 717/173 |
| 2012/0110058 A1* | 5/2012 | Kuroda | H04L 63/08 |
| | | | 709/203 |
| 2013/0275491 A1* | 10/2013 | Campbell | H04L 67/025 |
| | | | 709/203 |
| 2014/0173586 A1* | 6/2014 | Dugan | G06F 8/65 |
| | | | 717/173 |
| 2014/0223423 A1* | 8/2014 | Alsina | G06F 8/65 |
| | | | 717/173 |
| 2015/0234648 A1 | 8/2015 | Shinoda | |
| 2015/0317493 A1* | 11/2015 | Florez | G06F 21/6218 |
| | | | 713/155 |
| 2016/0073150 A1* | 3/2016 | Redei | H04N 21/2743 |
| | | | 725/109 |
| 2016/0342411 A1* | 11/2016 | Cooper | H04W 12/069 |
| 2017/0075516 A1* | 3/2017 | Park | G06F 3/0482 |
| 2017/0206100 A1* | 7/2017 | Somani | G06F 8/65 |
| 2017/0230437 A1* | 8/2017 | Kumar | H04L 67/10 |
| 2018/0020110 A1 | 1/2018 | Hirakata et al. | |
| 2018/0060572 A1* | 3/2018 | Singleton | G06F 21/552 |
| 2018/0143822 A1* | 5/2018 | VanBlon | G06F 8/65 |
| 2018/0199201 A1* | 7/2018 | Tsuda | H04N 21/454 |
| 2018/0270638 A1* | 9/2018 | Segal | H04W 52/0264 |
| 2018/0352044 A1* | 12/2018 | Gharabally | G06F 8/61 |
| 2019/0034188 A1* | 1/2019 | Pollack | G06F 8/65 |
| 2019/0068725 A1* | 2/2019 | Reyes | H04L 67/148 |
| 2019/0149514 A1* | 5/2019 | Jawahar | H04L 9/3268 |
| | | | 726/7 |
| 2019/0163878 A1* | 5/2019 | Dowdy | G06F 21/10 |
| 2019/0236533 A1* | 8/2019 | Gharabally | G06F 8/60 |
| 2019/0339960 A1* | 11/2019 | Kucheravy | G06F 8/60 |
| 2020/0007557 A1* | 1/2020 | Lang | H04W 12/08 |
| 2020/0067907 A1* | 2/2020 | Avetisov | H04L 9/3218 |
| 2020/0145510 A1* | 5/2020 | Sampath | H04L 67/2804 |
| 2020/0245147 A1* | 7/2020 | Segal | H04W 12/63 |
| 2021/0109836 A1* | 4/2021 | Cranfill | H04L 63/108 |
| 2021/0173933 A1* | 6/2021 | Mohinder | G06F 21/57 |
| 2021/0232640 A1* | 7/2021 | Ebeling | G06F 40/205 |

FOREIGN PATENT DOCUMENTS

| | | |
|---|---|---|
| JP | 2011-065495 A | 3/2011 |
| JP | 2012-248051 A | 12/2012 |
| JP | 5400870 B2 | 1/2014 |
| JP | 2015-153266 A | 8/2015 |
| JP | 2018-018501 A | 2/2018 |
| WO | 2008075447 A1 | 6/2008 |
| WO | 2009/137477 A2 | 11/2009 |

OTHER PUBLICATIONS

"Contact by iTunes Connect as in Review of Application has being leaving for long period of time", http://da-yasu.com/?p=5291, Apr. 5, 2017, Searched Oct. 2, 2020 (13 pages total).

Communication dated Jan. 19, 2021, from the Japanese Patent Office in Application No. 2020-012311.

Communication dated Oct. 27, 2020, from the Japanese Patent Office in Application No. 2020-012311.

* cited by examiner

| NAME | CREATOR | ACCOUNT ID | EXAMINATION STATUS | PUBLICA-TION | DATE OF APPLICATION |
|---|---|---|---|---|---|
| APPLET 1 | USER 1 | AAA123 | APPROVED | B | 18.11.3 |
| APPLET 2 | USER 2 | AAA576 | RESERVED | B | 18.12.5 |
| APPLET 3 | USER 3 | BAB738 | DISAPPROVED | C | 18.12.20 |
| | | | | | |

FIG.15

| NAME | CREATOR | ACCOUNT ID | EXAMINATION STATUS | PUBLI-CATION | DATE OF APPLICATION | INVITATION |
|---|---|---|---|---|---|---|
| APPLET 1 | USER 1 | AAA123 | APPROVED | B | 18.11.3 | AAA576 |
| APPLET 2 | USER 2 | AAA576 | RESERVED | B | 18.12.5 | |
| APPLET 3 | USER 3 | BAB738 | DISAPPROVED | C | 18.12.20 | |

FIG.17

| FAILED ITEM | APPLICATION INFORMATION AUTOMATIC REINPUT (○: INPUT) | | | | |
|---|---|---|---|---|---|
| | I1 | I2 | I3 | I4 | I5 |
| A1 | ○ | ○ | ○ | ○ | ○ |
| A2 | ○ | ○ | ○ | ○ | ○ |
| A3 | ○ | × | × | ○ | × |
| A4 | × | × | × | × | × |
| A5 | ○ | × | × | × | × |

PROGRAM MANAGEMENT SYSTEM, EXTERNAL DEVICE AND TERMINAL DEVICE FOR CONTROLLING A PROGRAM DEVELOPER'S ABILITY TO ACCESS, PUBLISH AND MANAGE MARKETING OF A PROGRAM

CROSS-REFERENCE TO RELATED APPLICATION(S)

The present application claims priority to and incorporates by reference the entire contents of Japanese Patent Application No. 2019-040300 filed in Japan on Mar. 6, 2019 and Japanese Patent Application No. 2020-012311 filed in Japan on Jan. 29, 2020.

BACKGROUND OF THE INVENTION

1. Field of the Invention

The present invention relates to a program management system, an external device, and a terminal device.

2. Description of the Related Art

As a conventional technique about a program management system, Japanese Patent No. 5400870 describes a method for applying an application program to an online repository, a computer-readable medium, and a computing system, for example.

By the way, in recent years, various software programs created by terminal devices or the like have been published on the Internet; there is room for further improvement in management of such computer programs.

SUMMARY OF THE INVENTION

The present invention has been made in view of the above circumstances, and an object thereof is to provide a program management system, an external device, and a terminal device that can appropriately manage a computer program.

In order to achieve the above mentioned object, a program management system according to one aspect of the present invention includes a terminal device having a terminal processing unit capable of executing processing to create a computer program, and a terminal communication unit capable of transmitting the computer program created by the terminal processing unit to an outside; and an external device having an external device storage unit storing therein the computer program transmitted from the terminal device, and an external device processing unit capable of executing processing to give approval to the computer program stored in the external device storage unit, wherein the external device storage unit stores therein appropriateness of the approval of the computer program as first status information together with the computer program, and the external device processing unit is capable of executing processing to manage the computer program based on the first status information.

According to another aspect of the present invention, in the program management system, it is possible to configure that the terminal device has a terminal display unit that is controlled by the terminal processing unit and is capable of displaying images, and the terminal processing unit causes the terminal display unit to display an image representing the computer program and a first status image representing the first status information of the computer program.

According to still another aspect of the present invention, in the program management system, it is possible to configure that the external device storage unit stores therein the computer program together with second status information representing a degree of publication of the computer program to the outside, and the external device processing unit is capable of executing processing to publish the computer program to the outside based on the first status information and the second status information.

According to still another aspect of the present invention, in the program management system, it is possible to configure that the external device processing unit, when the first status information or the second status information is updated, is capable of executing processing to limit publication of the computer program that has been published to the outside based on update contents of the first status information or the second status information.

According to still another aspect of the present invention, in the program management system, it is possible to configure that the external device processing unit, after executing the processing to limit publication of the computer program, is capable of executing processing to limit use of the computer program for a device that has already stored therein the computer program.

According to still another aspect of the present invention, in the program management system, it is possible to configure that the external device processing unit, after executing the processing to limit publication of the computer program, is capable of executing processing to notify a device that has already stored therein the computer program of limitation of use of the computer program.

According to still another aspect of the present invention, in the program management system, it is possible to configure that the external device processing unit, after executing the processing to notify a device that has already stored therein the computer program of limitation of use of the computer program, is capable of executing processing to present to the device a computer program as an alternative to the computer program that has been limited in use.

According to still another aspect of the present invention, in the program management system, it is possible to configure that the external device storage unit stores therein the computer program together with third status information representing charging contents of the computer program, and the external device processing unit is capable of executing processing to enable the computer program to be downloaded based on the first status information and the third status information.

According to still another aspect of the present invention, in the program management system, it is possible to configure that the external device storage unit stores therein the computer program together with fourth status information representing a use status of the computer program, and the external device processing unit is capable of executing processing to calculate a reward for the computer program based on the fourth status information.

According to still another aspect of the present invention, in the program management system, it is possible to configure that the external device storage unit stores therein the computer program together with fifth status information representing a user who is able to use the computer program, and the external device processing unit is capable of executing processing to enable the computer program to be downloaded based on the first status information and the fifth status information.

According to still another aspect of the present invention, in the program management system, it is possible to configure that the external device processing unit is capable of executing processing to notify a device associated with the user who is able to use the computer program of availability of the computer program based on the fifth status information.

According to still another aspect of the present invention, in the program management system, it is possible to configure that the external device processing unit, after executing the processing to notify the device associated with the user who is able to use the computer program of availability of the computer program, is capable of executing processing to download the computer program to the device when an operation to accept use of the computer program is performed in the device.

According to still another aspect of the present invention, in the program management system, it is possible to configure that the terminal communication unit transmits to the external device the computer program together with application information input to the terminal device, and the external device processing unit is capable of executing processing, when the computer program has not been approved, to change an item to be automatically reinput in the terminal device as the application information in accordance with an item that has not been approved.

According to still another aspect of the present invention, in the program management system, it is possible to configure that the computer program is a service block program defining output information output by a device to be operated, a trigger block program defining contents of a trigger invoking an action for outputting the output information and a trigger generation unit generating the trigger to cause the trigger generation unit to generate the trigger, an action block program defining contents of the action and an action execution unit executing the action to cause the action execution unit to execute the action, or an application program that is a combination of the service block program, the trigger block program, and the action block program.

In order to achieve the above mentioned object, an external device according to still another aspect of the present invention includes an external device communication unit capable of receiving, from a terminal device creating a computer program and capable of transmitting the created computer program to an outside, the computer program transmitted from the terminal device; an external device storage unit storing therein the computer program transmitted from the terminal device and received by the external device communication unit; and an external device processing unit capable of executing processing to give approval to the computer program stored in the external device storage unit, wherein the external device storage unit stores therein appropriateness of the approval of the computer program as first status information together with the computer program, and the external device processing unit is capable of executing processing to manage the computer program based on the first status information.

In order to achieve the above mentioned object, a terminal device according to still another aspect of the present invention includes a terminal processing unit capable of executing processing to create a computer program; and a terminal communication unit capable of transmitting the computer program created by the terminal processing unit to an outside, wherein the terminal device transmits the computer program requiring approval from the terminal communication unit to an external device, the external device having an external device communication unit capable of receiving the computer program transmitted from the terminal communication unit, an external device storage unit storing therein the computer program received by the external device communication unit, and an external device processing unit capable of executing processing to give the approval to the computer program stored in the external device storage unit, and the external device is capable of executing processing to manage the computer program based on first status information representing appropriateness of the approval.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a diagram of an exemplary created program list in the external device included in the program management system according to the modification;

FIG. 17 is a schematic diagram illustrating items to be automatically reinput as application information when the created program is reexamined in the program management system according to the modification.

DETAILED DESCRIPTION OF THE PREFERRED EMBODIMENTS

The following describes an embodiment according to the present invention in detail based on the accompanying drawings. This embodiment does not limit this invention. Components in the following embodiment include ones that can be replaced by those skilled in the art and are easy or substantially the same ones.

EMBODIMENT

Outline of Program Management System

Figure 1:
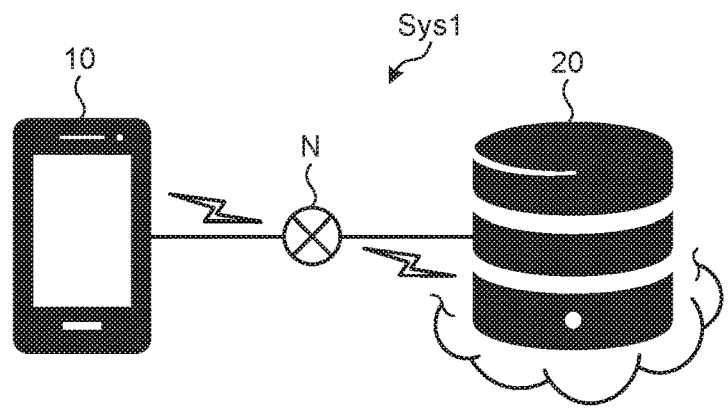
FIG. 1 is a block diagram of a schematic configuration of a program management system according to an embodiment.

A program management system Sys1 of the present embodiment illustrated in FIG. 1 is a system that includes a terminal device 10 and an external device 20 and can appropriately manage a computer program created by the terminal device 10 by the external device 20 by causing them to mutually communicate and cooperate. The terminal device 10 is an electronic device that can create a software program to be managed by the program management system Sys1. The external device 20 forms a cloud service device (a cloud server) installed on a network N. The network N includes any communication network regardless of wireless communication using Wi-Fi (registered trademark), 4G, 5G, or the like or wired communication using a communication line and communicably connects the external device 20 and the terminal device 10 to each other. The external device 20 and the terminal device 10 typically mutually communicate via the network N. The terminal device 10 typically mutually communicates and cooperates with the external device 20 and can thereby receive various cloud services from the external device 20. The program management system Sys1 of the present embodiment, based on various status information (in other words, attribute information) on the computer program created by the terminal device 10, manages the computer program by the external device 20. The following describes components of the program management system Sys1 in detail with reference to the drawings.

Computer Program to be Managed

The following first describes a software program to be managed by the program management system Sys1. In the present embodiment, the software program to be managed is a computer program that is executed by a device to be operated to operate the device to be operated.

The device to be operated is a device operated by the computer program to be managed by the program management system Sys1. The device to be operated is typically configured to be portable by a user; this is not limiting. The device to be operated can include a smartphone, a tablet personal computer (PC), a notebook PC, a desktop PC, a personal digital assistant (PDA), a portable game machine, or wearable device wearable on a human body, for example. Examples of the wearable device include devices such as a wristband type one, a glasses type one, a ring type one, a shoe type one, and a pendant type one. The device to be operated may include the terminal device 10 or an electronic watch that can mutually communicate with the terminal device 10, for example.

In the present embodiment, the software program to be managed is typically a computer program relatively small in size executed in a manner incorporated in another application program such as a browser of the device to be operated. The following describes the software program to be managed on the assumption that it is an applet as an application program executed on the browser or various kinds of block programs forming the applet as an example.

The applet is typically positioned as an application program with a set sequence.

The applet of the present embodiment is a computer program that is executed by the device to be operated to operate the device to be operated. The applet may be a computer program causing the device to be operated to perform a certain operation as a single device or a computer program causing a plurality of devices to be operated to perform a certain operation in cooperation with each other. The applet of the present embodiment includes a plurality of block programs. In this example, the applet includes a service block program, a trigger block program, and an action block program as the block programs, and these three elements are combined to construct one applet. In the following description, the service block program may be referred to as a "service block," the trigger block program may be referred to as a "trigger block," and the action block program may be referred to as an "action block."

The service block is a computer program defining output information output by the device to be operated in accordance with service contents corresponding to a purpose desired by the user. In other words, the service block is a computer program identifying the contents of the output information desired to be acquired in accordance with the service contents.

The trigger block is a computer program defining contents of a trigger invoking an action for outputting the output information corresponding to the service contents and a trigger generation unit generating the trigger to cause the trigger generation unit to generate the trigger. The trigger is a cause for invoking the action corresponding to the service contents. The trigger generation unit is a unit provided in the device to be operated to generate the trigger. Examples of the unit that can form the trigger generation unit in the device to be operated (a trigger generation unit candidate) include an input unit, a detector, and a timing unit of the device to be operated. The input unit of the device to be operated is a part receiving various input to the device to be operated and may include a touch panel, an operating button, a voice input device, a crown, a push button, or a register ring, for example. The detector of the device to be operated is a detector detecting various information and may include an acceleration sensor, a tilt switch, an illumination sensor, a temperature sensor, a voltage sensor, or a positioner, for example. The timing unit of the device to be operated is a circuit measuring a time (a device internal time). Examples of the trigger generated by the trigger generation unit include certain input to the input unit, detection of certain information by the detector, and a timing result by the timing unit. The trigger block causes the trigger generation unit defined by the trigger block to generate the trigger by causing the applet including the trigger block to be executed by a processing unit of the device to be operated.

The action block is a computer program defining contents of the action for outputting the output information corresponding to the service contents and an action execution unit executing the action to cause the action execution unit to execute the action. The action is an operation corresponding to contents of a service provided by the applet. The action execution unit is a unit provided in the device to be operated to execute the action. Examples of the unit that can form the action execution unit in the device to be operated (an action execution unit candidate) include a communication unit and an output unit of the device to be operated. The communication unit of the device to be operated is a communication module that can communicate with the outside of the device to be operated. The output unit of the device to be operated is a part performing various output in the device to be operated and may include a display, a display lamp, a speaker/alarm buzzer, a vibrator, a pointer, or a date plate, for example. Examples of the action executed by the action execution unit include output of the output information to the outside by the communication unit and output of the output information by the output unit. The action block causes the action execution unit defined by the action block to execute the action for outputting the output information by causing the applet including the action block to be executed by the processing unit of the device to be operated.

The applet formed as described above includes the service block, the trigger block, and the action block described above and defines the output information corresponding to the service contents, the trigger, and the action in association with each other. The applet is stored in a storage unit of the device to be operated via the network N or a near-field wireless communication, for example. The applet is executed by the processing unit of the device to be operated to enable the action execution unit to execute the action outputting the output information corresponding to the service contents by the trigger generated by the trigger generation unit.

For example, a storage unit 23 of the external device 20 described below or a storage unit of another external device is provided with a block program storage area (not illustrated), and the block program storage area stores therein many block programs for use in the service block, the trigger block, and the action block. In a process of creating the applet by the terminal device 10 described below, a plurality of block programs of the block program storage area are displayed by purpose via the network N, and any block programs can be selected therefrom, for example. Association and detailed operational conditions of the selected block programs are defined and are stored as the applet in a storage unit 15 of the terminal device 10 described below.

When causing the device to be operated to perform a certain operation as a single device, the applet is stored in the device to be operated to cause the device to be operated to perform generation of the trigger by the trigger generation unit, acquisition of information on the output information, and execution of the action by the action execution unit. In this case, the applet, with the trigger generation by the device to be operated as a starting point, causes the device to be operated to acquire the information on the output information corresponding to the service contents from an external device and causes the device to be operated to execute the action to output the output information corresponding to the service contents based on the acquired information, for example. When causing a plurality of devices to be operated to perform a certain operation in cooperation with each other, the applet is stored in any of the devices to be operated and causes the devices to be operated to perform generation of the trigger by the trigger generation unit, acquisition of the information on the output information, and execution of the action by the action execution unit in cooperation with each other. In this case, the applet, with the trigger generation by a first device to be operated as a starting point, causes a second device to be operated to acquire the information on the output information corresponding to the service contents from the external device in accordance with the trigger and to transmit the acquired information to the first device to be operated, and causes the first device to be operated to execute the action to output the output information corresponding to the service contents based on the acquired information, for example. The applet may include the service block, the trigger block, and the action block each including a plurality of block programs. In other words, in one applet, a plurality of pieces of output information may be defined by the service block, a plurality of triggers may be defined by the trigger block, and a plurality of actions may be defined by the action block.

In the present embodiment, the software program to be managed by the program management system Sys1 is the service block, the trigger block, the action block, or the applet that is a combination of the service block, the trigger block, and the action block described above.

Basic Configuration of Terminal Device

The terminal device 10 is an electronic device that can create the software program to be managed by the program management system Sys1 as described above. The terminal device 10 can create various kinds of computer programs in cooperation with various kinds of devices including the external device 20, for example. The terminal device 10 of the present embodiment can create the service block, the trigger block, the action block, or the applet described above as the software program to be managed. The terminal device 10 can include a smartphone, a tablet PC, a notebook PC, or a desktop PC, for example. The example in FIG. 1 or the like illustrates the terminal device 10 as being a smartphone.

The terminal device 10 includes an electronic circuit mainly including a known microcomputer including a central processing unit (CPU) and various kinds of storage devices such as a semiconductor memory. The terminal device 10 can also be formed by installing computer programs causing a computer system such as a known PC or workstation to implement various processing.

Figure 2:
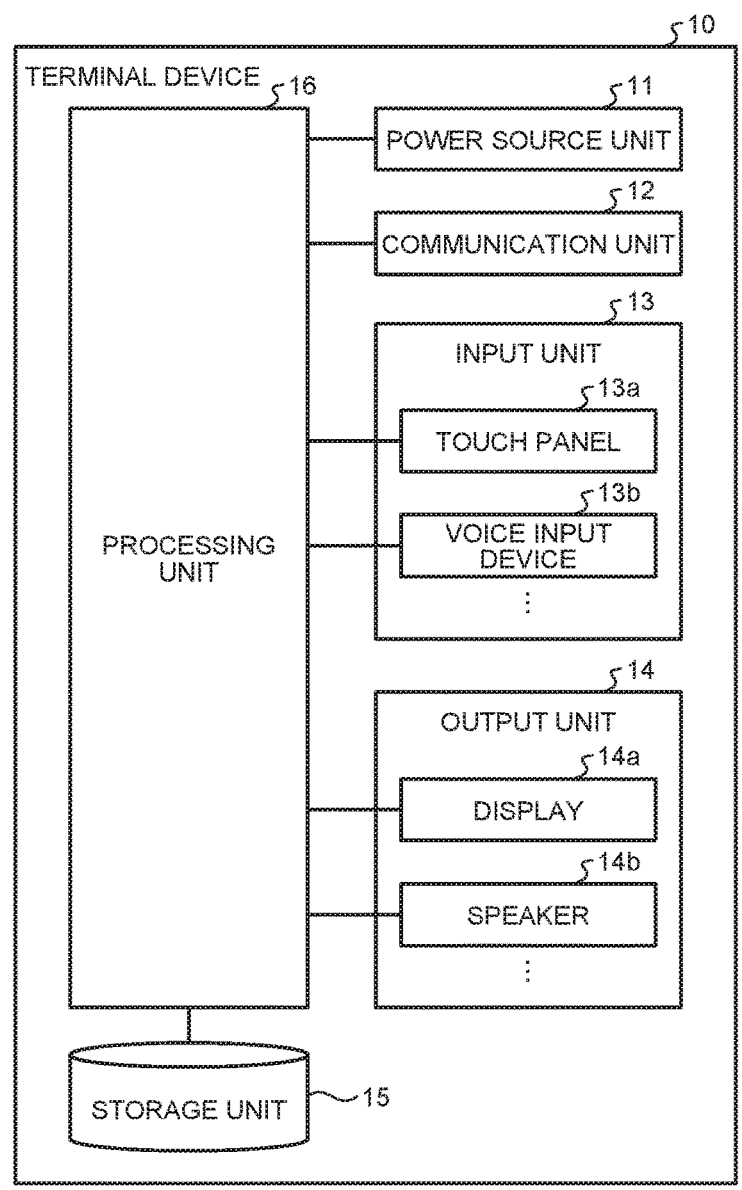
FIG. 2 is a block diagram of a schematic configuration of a terminal device included in the program management system according to the embodiment.

Specifically, as illustrated in FIG. 2, the terminal device 10 has a power source unit 11, a communication unit 12 as a terminal communication unit, an input unit 13, an output unit 14, the storage unit 15 as a terminal storage unit, and a processing unit 16 as a terminal processing unit.

The power source unit 11 is an electric power source of the terminal device 10. The power source unit 11 includes a chargeable/dischargeable secondary battery such as a lithium-ion battery and supplies electric power to the units in the terminal device 10.

The communication unit 12 is a communication module that can communicate with the outside of the terminal device 10. The communication unit 12 can communicate with at least the external device 20. The communication unit 12 is communicably connected to the network N regardless of wireless communication or wired communication and communicates with the external device 20 via the network N.

The input unit 13 is a part receiving various input to the terminal device 10. The input unit 13 includes a touch panel 13a receiving operation input to the terminal device 10 or a voice input device 13b receiving voice input to the terminal device 10, for example. In addition, the input unit 13 may include an input device such as a keyboard or a mouse pointer.

The output unit 14 is a part performing various output in the terminal device 10. The output unit 14 includes a display 14a outputting image information and a speaker 14b outputting sound information, for example. The display 14a forms a terminal display unit that is controlled by the processing unit 16 and is capable of displaying images. The display 14a includes an image display device such as a liquid crystal display, a plasma display, or an organic electro-luminescence (EL) display displaying images, for example. The touch panel 13a described above is provided on the surface of this display 14a in a superimposed manner.

The storage unit 15 is a storage device such as a read only memory (ROM), a random access memory (RAM), or a semiconductor memory incorporated in the terminal device 10. The storage unit 15 stores therein conditions and information required for various kinds of processing in the terminal device 10, various kinds of computer programs executed by the terminal device 10, control data, and the like. The storage unit 15 can store therein various kinds of information received by the communication unit 12, various kinds of information input by the input unit 13, and various kinds of information output by the output unit 14, for example. The storage unit 15, as the various kinds of information received by the communication unit 12, can store therein the service block, the trigger block, the action block, the applet, or the like downloaded from the external device 20 or the like via the communication unit 12, for example. The processing unit 16 or the like reads these pieces of information from the storage unit 15 as needed.

The processing unit 16 is electrically connected to the units of the terminal device 10 to comprehensively control the units of the terminal device 10. The processing unit 16 includes an electronic circuit mainly including a known microcomputer including a central processing unit (CPU). The processing unit 16 is communicably connected to the units of the terminal device 10 and can exchange various kinds of signals with the units. The processing unit 16 executes the various kinds of computer programs stored in the storage unit 15, operates the units of the terminal device 10 through operation of the computer programs, and executes various processing for implementing various kinds of functions. The processing unit 16 can execute processing to receive and download various kinds of information from the external device 20 via the communication unit 12 and to store the various kinds of information in the storage unit 15 in accordance with input to the input unit 13, for example. The processing unit 16 can execute processing to transmit and upload various kinds of information to the external device 20 via the communication unit 12 in accordance with input to the input unit 13, for example.

Creation of Computer Program

The processing unit 16 of the present embodiment can execute processing to create the service block, the trigger block, the action block, or the applet in accordance with input to the input unit 13. As described above, the processing unit 16 can create the service block, the trigger block, the action block, or the applet in accordance with the input to the input unit 13 based on creation information acquired from a device such as the external device 20 via the communication unit 12, for example. The creation information is various information referred to when the service block, the trigger block, the action block, or the applet is created as described above. The creation information may include information on candidates for the service contents, the trigger contents, the action contents, the trigger generation unit, the action execution unit, and the like or candidates for the service block, the trigger block, the action block, and the like forming the applet, for example. The creation information may include a computer program for program creation for creating the service block, the trigger block, the action block, and the applet, for example. In this case, the processing unit 16 may create the service block, the trigger block, the action block, and the applet in accordance with the computer program for program creation. The processing unit 16 can also create the service block, the trigger block, the action block, and the applet in accordance with input to the input unit 13 not depending on such creation information as described above, for example. The storage unit 15 can store therein the service block, the trigger block, the action block, and the applet created by the processing unit 16. In the following description, the service block, the trigger block, the action block, and the applet that is a combination of these blocks created by the processing unit 16 may be referred to as a "created program." The computer program for program creation for creating the service block, the trigger block, the action block, and the applet can be used by being freely installed on the terminal device 10 from the external device 20 or the other external device by a user of the terminal device 10. Consequently, an unspecified large number of users can create the created program based on their own tastes.

Upload of Computer Program to External Device

The processing unit 16 of the present embodiment can execute processing to transmit and upload the created program to the external device 20 via the communication unit 12 in accordance with input to the input unit 13, for example. That is to say, the communication unit 12 of the present embodiment can transmit the created program created by the processing unit 16 to the outside, or the external device 20 in this example. The terminal device 10 of the present embodiment transmits the created program created by the processing unit 16 as described above to the outside external device 20 via the communication unit 12.

In this case, the processing unit 16 may transmit and upload the created program together with meta-information of the created program or information on publication to the external device 20. The meta-information of the computer program is additional information on the computer program itself attached to the computer program and is information such as "name," "creator," "account ID of creator," or "date of creation" of the computer program, for example. "Name" of the computer program can be set afterward as described below. "Creator," "account ID of creator," and the like of the computer program are set in advance in connection with a user possessing the terminal device 10 that has created the computer program, for example. "Date of creation" of the computer program is attached when the computer program is created. The information on publication of the computer program is information representing a degree of publication of the computer program to the outside and is information representing any of "nonpublication," "limited publication," and "general publication," for example. "Nonpublication" means that the computer program is not published to the outside. "Limited publication" means that the computer program is published to the outside in a limited manner and means that the computer program is published with a publication target or the like limited, for example. "General publication" means that the computer program is published to the outside without limitation. This information on publication of the computer program corresponds to second status information described below and is used for management of the computer program by the external device 20.

Figure 3:
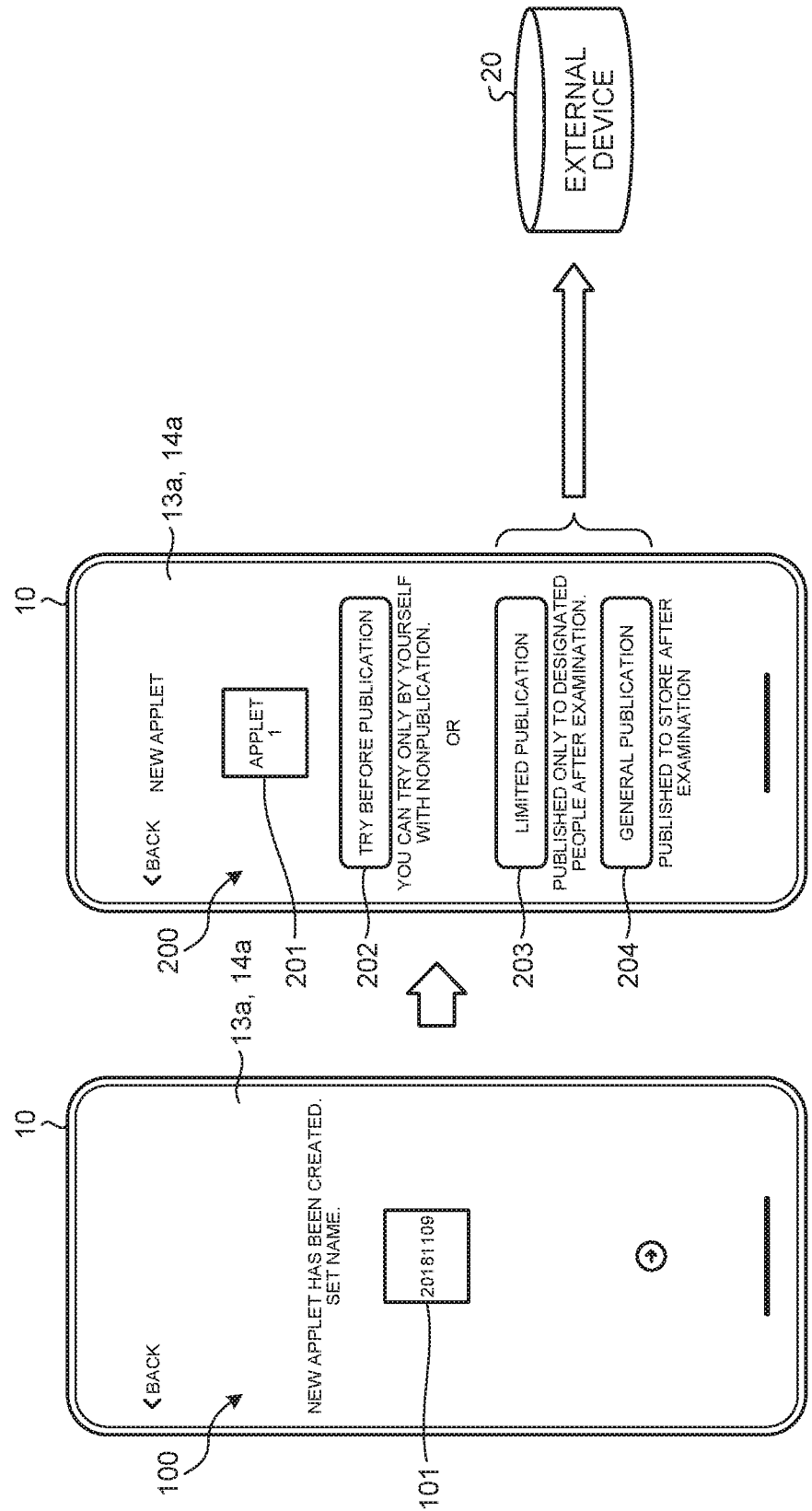
FIG. 3 is a diagram of an exemplary selection screen of the terminal device of the program management system according to the embodiment.

The processing unit 16 can cause the creator to select various information on the created program via selection screens 100 and 200 in FIG. 3, for example. The processing unit 16, upon completion of creation of the computer program, causes the display 14a to display the selection screen 100 exemplified in FIG. 3, for example. The selection screen 100 exemplified in FIG. 3 is a screen operated in order to select a name of the created program and displays an icon image 101 representing the created program together with letter images such as "New applet has been created." and "Set name.," for example. In this example, to the icon image 101, the date of creation ("20181109" in the example in FIG. 3) of the created program is attached as a temporary "name" of the created program. When the icon image 101 is selected in accordance with a tap operation or the like by the creator on the touch panel 13a in the selection screen 100 exemplified in FIG. 3, the processing unit 16 displays what is called a software keyboard within the selection screen 100 to receive an input operation of "name" by the creator via the touch panel 13a, for example.

Next, the processing unit 16 causes the display 14a to display the selection screen 200 exemplified in FIG. 3, for example. The selection screen 200 exemplified in FIG. 3 is a screen operated in order to select the information on publication of the created program and displays a nonpublication selection area 202, a limited publication selection area 203, and a general publication selection area 204 together with an icon image 201 representing the created program, for example. The nonpublication selection area 202 is an area selected when the created program is made "nonpublication" and displays a letter image such as "TRY BEFORE PUBLICATION" together with a letter image such as "You can try only by yourself with nonpublication." as an example. The limited publication selection area 203 is an area selected when the created program is made "limited publication" and displays a letter image such as "LIMITED PUBLICATION" together with a letter image such as "Published only to designated people after examination." as an example. The general publication selection area 204 is an area selected when the created program is made "general publication" and displays a letter image such as "GENERAL PUBLICATION" together with a letter image such as "Published to STORE after examination." as an example.

The processing unit 16, when the nonpublication selection area 202 is selected in accordance with the tap operation or the like by the creator on the touch panel 13a in the selection screen 200 illustrated in FIG. 3, attaches the information on publication representing "nonpublication" to the created program. In this case, the processing unit 16 stores the created program to which the information on publication representing "nonpublication" is attached together with the meta-information and the information on publication in the storage unit 15 but does not upload the created program to the external device 20.

The processing unit 16, when the limited publication selection area 203 is selected in accordance with the tap operation or the like by the creator on the touch panel 13a in the selection screen 200 illustrated in FIG. 3, attaches the information on publication representing "limited publication" to the created program. In this case, the processing unit 16 stores the created program to which the information on publication representing "limited publication" is attached together with the meta-information and the information on publication in the storage unit 15 and transmits and uploads the created program to the external device 20.

The processing unit 16, when the general publication selection area 204 is selected in accordance with the tap operation or the like by the creator on the touch panel 13a in the selection screen 200 illustrated in FIG. 3, attaches the information on publication representing "general publication" to the created program. In this case, the processing unit 16 stores the created program to which the information on publication representing "general publication" is attached together with the meta-information and the information on publication in the storage unit 15 and transmits and uploads the created program to the external device 20.

Although this example states that the processing unit 16 does not upload the created program to which the information on publication representing "nonpublication" is attached to the external device 20, this is not limiting. The processing unit 16 may transmit and upload the created program including the created program to which the information on publication representing "nonpublication" is attached to the external device 20.

The created program to which the information on publication representing "limited publication" or "general publication" is attached corresponds to the created program requiring approval by the external device 20 described below. That is to say, the processing unit 16 of the present embodiment transmits at least the created program requiring approval from the communication unit 12 to the external device 20. The processing unit 16 can transmit all created programs requiring approval from the communication unit 12 to the external device 20, for example.

When "limited publication" or "general publication" is selected in a creation process of the created program or a setting process after the end of creation, the created program is transmitted from the terminal device 10 to the external device 20 and is stored in a created program storage unit 23A of the external device 20 (refer to FIG. 4) described below. As described above, the computer program for creating the created program can be installed freely from the external device 20 on the terminal device 10 or another device, and thus an unspecified large number of users can create the created program. Consequently, a large number of created programs are uploaded to the external device 20; the created program of the present embodiment is not large-capacity data such as a moving image and game software but is a text-based small-sized computer program and is thus small in capacity, and thus, for example, even when at least all the created programs requiring approval are stored in the storage unit 23, a problem such as pressing of storage capacity does not arise.

The created program transmitted and uploaded from the terminal device 10 to the external device 20 is stored in the created program storage unit 23A, thereby facilitating management in cooperation with many block programs forming the created programs similarly stored in the external device 20.

For example, when a creator stops publication of its own block program, all created programs using this block program become unable to operate. Consequently, this causes necessity to quickly notify the creator and users of the created program that has become unable to operate of the fact. For example, in a method such as Japanese Patent No. 5400870 described above, when a computer program is uploaded from a user to a repository server, whether an application is approved is determined, conformity by metadata is further determined, and only one conforming thereto is received by the repository server; thus only partial computer programs out of many computer programs applied by the user are stored in the server. Consequently, when the method of Japanese Patent No. 5400870 is used for upload of the created program, a notification about nonoperation for the created program due to stopping of publication of the block program is provided only to creators and users of the partial computer programs left in the server. However, the notification about stopping of publication of the block program should be provided not only to creators of created programs that have been approved to be published by examination but also in a similar way to those of created programs being reserved to be examined and not permitted to be published. On the contrary, the program management system Sys1 of the present embodiment storing therein the created program transmitted and uploaded from the terminal device 10 to the external device 20, or typically the created program requiring approval (in other words, the created program related to publication) can address the above problem, if it occurs. Not limited to the above case, a similar effect can also be produced in the case of a version upgrade or the like of the block program. The following describes details of the external device 20 with reference to FIG. 4 and the like.

Basic Configuration of External Device

As described above, the external device 20 forms the cloud service device (the cloud server) installed on the network N. The external device 20 forms what is called a repository on the network N. The external device 20 manages the created program created and uploaded by the terminal device 10 based on various status information on the created program. Management of the computer program by the external device 20 includes an approval examination of the computer program, making the computer program into a database, publication of the computer program, and the like. The external device 20 includes an electronic circuit mainly including a known microcomputer including a central processing unit (CPU) and various kinds of storage devices. The external device 20 can also be formed by installing computer programs causing a computer system such as a known PC or workstation to implement various processing. The external device 20 may include a single device or formed by combining a plurality of devices in a mutually communicable manner.

Figure 4:
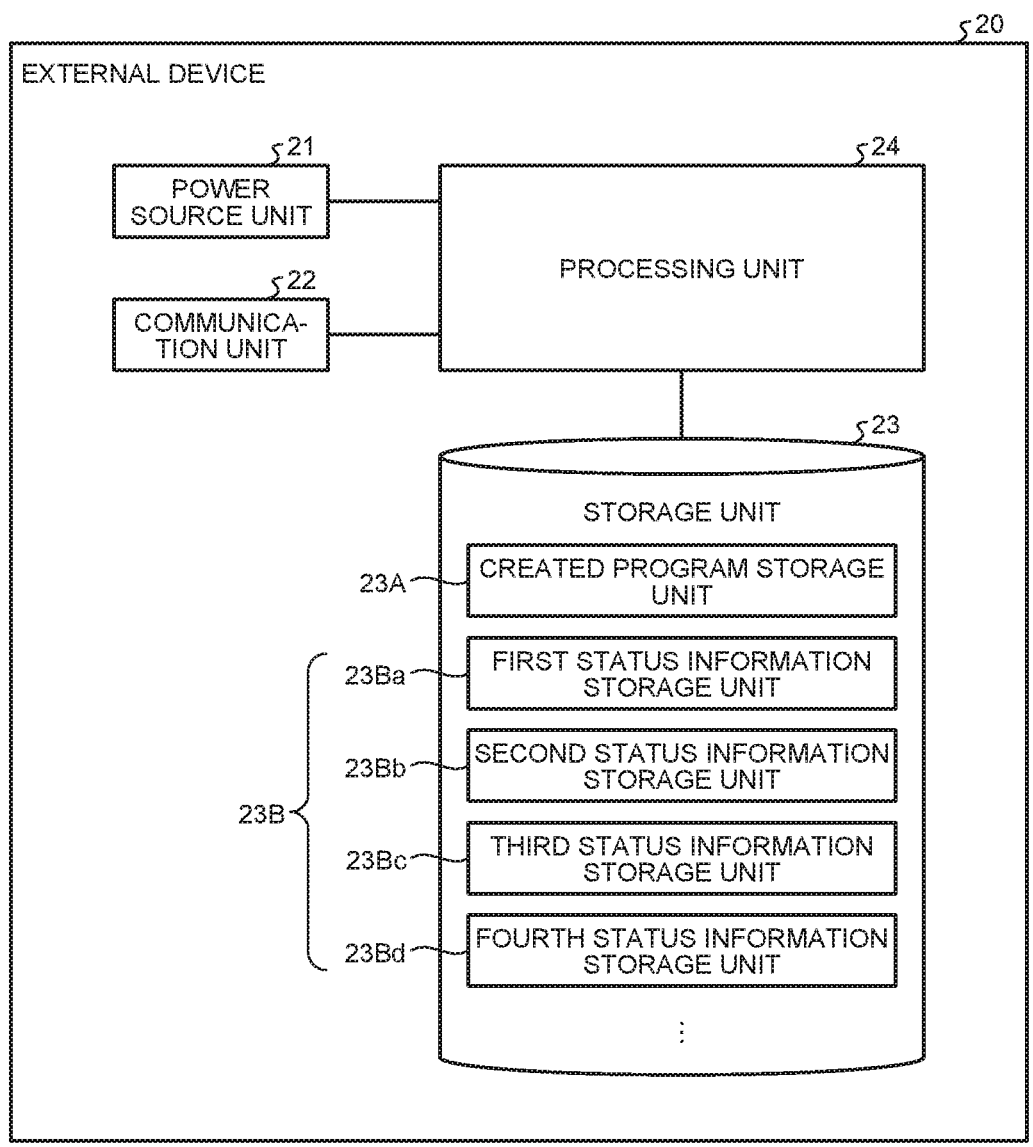
FIG. 4 is a block diagram of a schematic configuration of an external device included in the program management system according to the embodiment.

Specifically, as illustrated in FIG. 4, the external device 20 has a power source unit 21, a communication unit 22 as an external device communication unit, the storage unit 23 as an external device storage unit, and a processing unit 24 as an external device processing unit.

The power source unit 21 is an electric power source of the external device 20. The power source unit 21 supplies electric power to the units of the external device 20 from a commercial power source, for example.

The communication unit 22 is a communication module that can communicate with the outside of the external device 20. The communication unit 22 can communicate with at least the terminal device 10 and can receive the created program transmitted from the terminal device 10. The communication unit 22 is communicably connected to the network N regardless of wireless communication or wired communication and communicates with the terminal device 10 or the like via the network N.

The storage unit 23 is a storage device such as a ROM, a RAM, or a semiconductor memory incorporated in the external device 20. Typically, the storage unit 23 has a relatively large storage capacity than the storage unit 15 or the like of the terminal device 10 described above. The storage unit 23 stores therein conditions and information required for various kinds of processing in the external device 20, various kinds of computer programs executed by the external device 20, control data, and the like. The storage unit 23 stores therein the created program transmitted from the terminal device 10 and received by the communication unit 22. The storage unit 23 can store therein all the created programs transmitted from the terminal device 10 and received by the communication unit 22, for example. The storage unit 23 stores therein various information required for management of computer programs in the program management system Sys1. The processing unit 24 or the like reads these pieces of information from the storage unit 23 as needed.

The processing unit 24 is electrically connected to the units of the external device 20 to comprehensively control the units of the external device 20. The processing unit 24 includes an electronic circuit mainly including a known microcomputer including a central processing unit (CPU). The processing unit 24 is communicably connected to the units of the external device 20 and can exchange various kinds of signals with the units. The processing unit 24 executes the various kinds of computer programs stored in the storage unit 23, operates the units of the external device 20 through operation of the computer programs, and executes various processing for implementing various kinds of functions. The processing unit 24 executes various processing required for various services in the program management system Sys1. The processing unit 24 can execute processing to receive various kinds of information from the terminal device 10 via the communication unit 22 and to store the various kinds of information in the storage unit 23, for example.

Approval Examination of Uploaded Computer Program

The processing unit 24 of the present embodiment can execute processing to give approval to the created program transmitted from the terminal device 10 and received by the communication unit 22. The processing unit 24 typically subjects the created program the information on publication (corresponding to the second status information described below) of which represents "limited publication" or "general publication" to an approval examination. That is to say, in this example, the approval examination of the created program typically corresponds to an approval examination of publication of the created program to the outside. However, this is not limiting; the processing unit 24 may also subject the created program the information on publication of which represents "nonpublication" to an approval examination. That is to say, the approval examination of the created program is not limited to one presupposing publication.

The processing unit 24 may analyze contents of the created program and the meta-information automatically using various known methods based on rules for approving publication of the created program to determine the appropriateness of approval of the created program, for example. The processing unit 24 may determine the appropriateness of approval of the created program by analyzing the contents of the created program and the meta-information by a person in charge and causing the appropriateness of approval to be input to the external device 20 based on the rules for approving publication of the created program, for example. In this example, the processing unit 24 determines any of "approval," "disapproval," and "reservation of approval" as a result of the approval examination of the created program. "Approval" means that publication of the created program has been approved. "Disapproval" means that publication of the created program has not been approved. "Reservation of approval" means that the approval of publication of the created program has been reserved and, in other words, means that it is currently under examination.

Figures 5, 6:
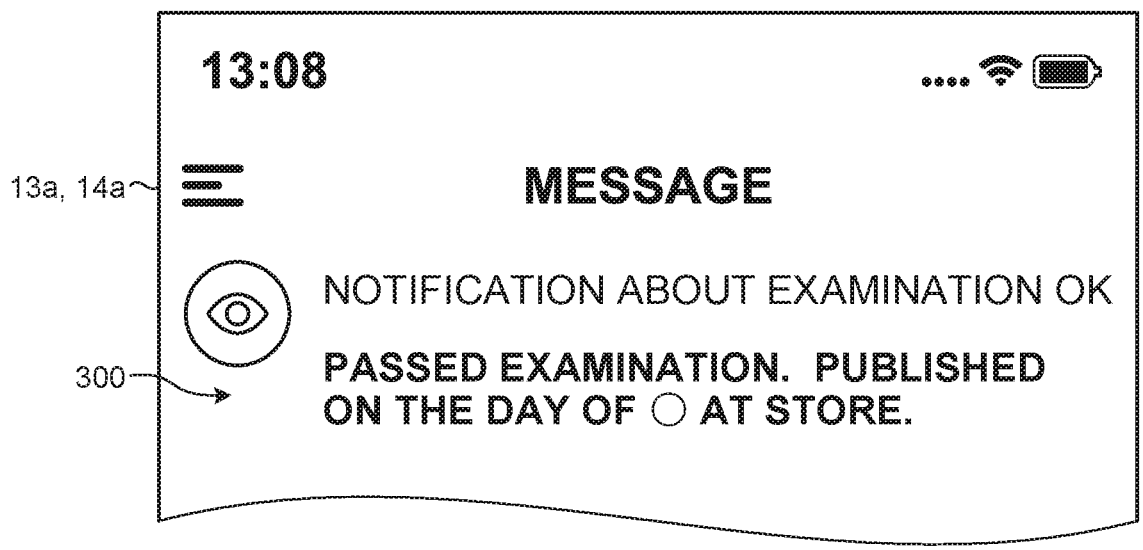
FIG. 5 is a diagram of an exemplary notification screen of a result of an approval examination in the terminal device included in the program management system according to the embodiment.
FIG. 6 is a diagram of an exemplary created program list in the external device included in the program management system according to the embodiment.

The processing unit 24 may notify the terminal device 10 of such a result of the approval examination of the created program as described above. In this case, the processing unit 24 transmits the result of the approval examination of the created program to the terminal device 10 via the communication unit 22. The processing unit 16 of the terminal device 10, upon reception of the result or message of the approval examination of the created program from the external device 20 via the communication unit 12, may cause the display 14a to display a notification screen 300 exemplified in FIG. 5 based on the received result or message of the approval examination. The notification screen 300 exemplified in FIG. 5 is a screen for providing a notification about the result of the approval examination of the created program. The notification screen 300 exemplified in FIG. 5 represents a screen when the created program has been "approved" as an example and displays letter images such as "Notification about examination OK," "Passed examination. Published on the day of ○ at Store."

Status Information of Computer Program

The storage unit 23 of the external device 20 in FIG. 4 stores therein the status information on each created program such as the result of the approval examination together with the created program transmitted from the terminal device 10. That is to say, the processing unit 24 processes the created program, the status information, the meta-information, and the like received by the communication unit 22 and stores them in the storage unit 23. In this example, the processing unit 24 stores the created program, the status information on the created program, and the meta-information on the created program in association (connection) with each other in the storage unit 23.

More specifically, the storage unit 23 functionally conceptually includes the created program storage unit 23A and a status information storage unit 23B.

The created program storage unit 23A is a storage area storing therein the created program transmitted from the terminal device 10 and received by the communication unit 22. The created program storage unit 23A stores therein the created program together with the meta-information of the created program received by the communication unit 22. The created program storage unit 23A can store therein the created program received from the terminal device 10 or another program creation device. The created program stored in the created program storage unit 23A can be downloaded to the terminal device 10 or another device via the network N and the like in accordance with the status information described below or the like and can be used.

The status information storage unit 23B is a storage area storing therein the status information on the created program transmitted from the terminal device 10 and received by the communication unit 22. The status information on the created program is various information representing the state and attribute of the created program. The status information stored in the status information storage unit 23B is stored in association (connection) with the created program and its meta-information stored in the created program storage unit 23A through processing by the processing unit 24.

The status information storage unit 23B of the present embodiment stores therein first status information, second status information, third status information, and fourth status information as the status information. That is to say, the storage unit 23 of the present embodiment can store therein the created program together with the first status information, the second status information, the third status information, and the fourth status information. In this example, the status information storage unit 23B includes a first status information storage unit 23Ba, a second status information storage unit 23Bb, a third status information storage unit 23Bc, and a fourth status information storage unit 23Bd storing therein the first status information, the second status information, the third status information, and the fourth status information, respectively.

The first status information storage unit 23Ba is a storage area storing therein the first status information as the status information. The first status information is information representing the appropriateness of approval of the created program by the processing unit 24 and information representing any of "approval," "disapproval," and "reservation of approval" described above, for example. The first status information is attached to the created program by the processing unit 24 of the external device 20 when a result is out in the approval examination described above. That is to say, the storage unit 23 of the present embodiment stores therein the appropriateness of approval of the created program as the first status information together with the created program.

The second status information storage unit 23Bb is a storage area storing therein the second status information as the status information. The second status information is information representing a degree of publication of the created program to the outside and is information representing any of "nonpublication," "limited publication," and "general publication" described above, for example. The second status information corresponds to the information on publication of the created program described above and is attached to the created program by the processing unit 16 of the terminal device 10.

The third status information storage unit 23Bc is a storage area storing therein the third status information as the status information. The third status information is information representing charging contents of the created program and is information representing any of "free of charge" and "paid," for example. "Free of charge" means that download of the created program is permitted free of charge. "Paid" means that download of the created program is permitted in a paid manner. The third status information is selected by the creator via a selection screen or the like on the terminal device 10 and is attached to the created program by the processing unit 16 of the terminal device 10 like the second status information described above. The third status information may further include information on "price" for the created program determined to be "paid."

The fourth status information storage unit 23Bd is a storage area storing therein the fourth status information as the status information. The fourth status information is information representing a use status of the created program and is information representing "number of download," "date and time of download," "success or failure of download," "account ID of using user," "frequency of use," and "date and time of use," for example. The fourth status information is collected by the processing unit 24 of the external device 20 and is attached to the created program.

Management of Computer Program

The processing unit 24 of the present embodiment can execute processing to manage the created program based on the first status information, the second status information, the third status information, and the fourth status information. The approval examination of the created program described above also corresponds to part of management of the created program by the processing unit 24.

Management of Computer Program: Made into List and Made into Database

The processing unit 24 of the external device 20 can make a plurality of created programs stored in the created program storage unit 23A into a list and a database together with the status information stored in the status information storage unit 23B. FIG. 6 is an exemplary created program list 400 with the created programs made into a list and a database by the processing unit 24. The created program list 400 illustrated in FIG. 6 includes "name," "creator," "account ID of creator," "examination status," "publication," and "date of application" of the created programs made into a list based on the first status information, the second status information, and the meta-information stored in the created program storage unit 23A, the first status information storage unit 23Ba, and the second status information storage unit 23Bb, respectively, as an example. "Name," "creator," "account ID of creator," and "date of application" are based on the meta-information of the created programs. "Examination status" is based on the first status information of the created programs. "Publication" is based on the second status information of the created programs; "B" represents "limited publication," and "C" represents "general publication," for example. The created program list 400 can be displayed on a display unit (not illustrated) of the external device 20 or a device for management, for example.

Management of Computer Program: Display of Examination Status

The processing unit 16 of the terminal device 10 can cause the display 14a to display an examination status of the created program based on the status information of each created program managed by the external device 20. The processing unit 16 refers to the information stored in the created program storage unit 23A and the first status information storage unit 23Ba of the external device 20 via the communication unit 12 and causes the display 14a to display the examination status of the created program created by the terminal device 10, for example. The processing unit 16 refers to the first status information stored in the first status information storage unit 23Ba and causes the display 14a to display icon images 501, 502, and 503 representing created programs and first status images 504, 505, and 506 representing the first status information of each of the created programs in a profile screen 500 exemplified in FIG. 7, for example.

Figure 7:
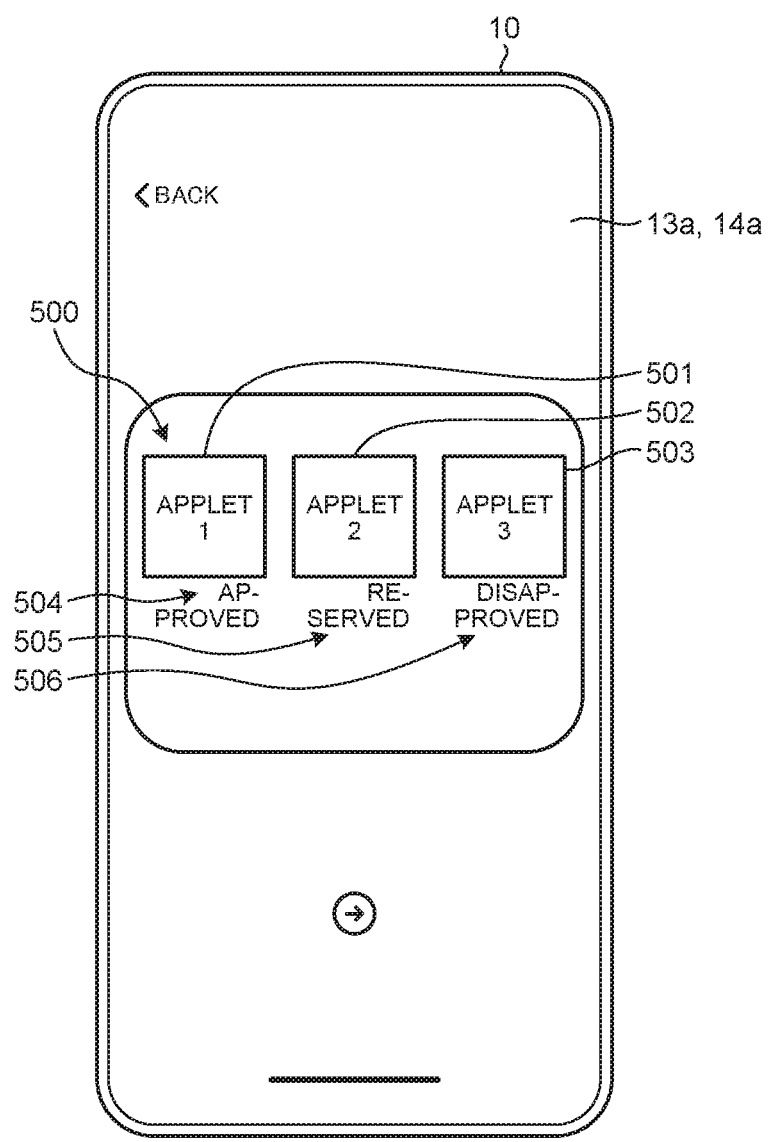
FIG. 7 is a diagram of an exemplary profile screen in the terminal device included in the program management system according to the embodiment.

The profile screen 500 exemplified in FIG. 7 is a screen displaying personal information on a user possessing the terminal device 10. The profile screen 500 exemplified in FIG. 7 displays the icon images 501, 502, and 503 about the created programs uploaded from the terminal device 10 to the external device 20 and the first status images 504, 505, and 506 as an example. The icon images 501, 502, and 503 are images representing icons imitating the respective created programs and represent the created programs that have been uploaded from the terminal device 10 to the external device 20 in this example. The first status images 504, 505, and 506 are images representing contents of the first status information of each of the created programs and are letter images such as "APPROVED," "RESERVED," and "DISAPPROVED" in this example. In other words, the first status images 504, 505, and 506 correspond to examination result images representing results of the approval examination of the created programs.

The processing unit 16 causes the profile screen 500 exemplified in FIG. 7 to display the first status image 504 with a letter image of "APPROVED" at a lower corner of the icon image 501 of the created program to which the first status information representing "approval" is attached. Similarly, the processing unit 16 causes the profile screen 500 exemplified in FIG. 7 to display the first status image 505 with a letter image of "RESERVED" at a lower corner of the icon image 502 of the created program to which the first status information representing "reservation of approval" is attached. Similarly, the processing unit 16 causes the profile screen 500 exemplified in FIG. 7 to display the first status image 506 with a letter image of "DISAPPROVED" at a lower corner of the icon image 503 of the created program to which the first status information representing "disapproval" is attached. With this operation, the terminal device 10 can report the status of the approval examination of the created program managed by the external device 20 in an easy-to-understand way.

The first status image representing the contents of the first status information of the created program is not limited to the above and may be other than the letter image; "approved," "reserved," and "disapproved" may be displayed with symbols or marks such as "○," "□," and "x," respectively, as images, for example.

Management of Computer Program: Publication

The processing unit 24 of the external device 20 can publish the created program stored in the created program storage unit 23A to the outside through filtering based on the status information stored in the status information storage unit 23B. Publishing the created program to the outside typically refers to enabling a device (including the terminal device 10, for example) communicably connected to the external device 20 via the network N to view and download the created program via a program store or the like.

Specifically, the processing unit 24 can execute processing to publish the created program to the outside based on the first status information stored in the first status information storage unit 23Ba and the second status information stored in the second status information storage unit 23Bb. The processing unit 24 publishes the created program to which the first status information representing "approval" is attached and to which the second status information representing "limited publication" or "general publication" is attached to the outside. The processing unit 24, when publishing the created program to the outside, publishes the created program to which the second status information representing "limited publication" is attached to a limited publication target set in advance. The processing unit 24, when publishing the created program to the outside, publishes the created program to which the second status information representing "general publication" is attached without limiting a publication target or the like. On the other hand, the processing unit 24 does not publish the created program to which the first status information representing "reservation of approval" or "disapproval" is attached or the created program to which the second status information representing "nonpublication" is attached to the outside. That is to say, the processing unit 24 filters and extracts the created program to which the first status information representing "approval" is attached and to which the second status information representing "limited publication" or "general publication" is attached out of the created programs stored in the created program storage unit 23A and causes a device such as the terminal device 10 to display the extracted created program as a downloadable created program.

Management of Computer Program: Download

The processing unit 24 of the external device 20 can enable the created program stored in the created program storage unit 23A to be downloaded based on the status information stored in the status information storage unit 23B. In this case, the processing unit 24 can execute processing to enable the created program to be downloaded based on the first status information stored in the first status information storage unit 23Ba and the third status information stored in the third status information storage unit 23Bc, for example. For the created program to which the first status information representing "approval" is attached and to which the third status information representing "free of charge" is attached, the processing unit 24 enables the created program to be downloaded to the device such as the terminal device 10 regardless of a free-of-charge member or a paid member, for example. On the other hand, for the created program to which the first status information representing "approval" is attached and to which the third status information representing "paid" is attached, the processing unit 24 enables the created program to be downloaded to the device such as the terminal device 10 only for the paid member and disables download for the free-of-charge member. The processing unit 24 can discriminate between the free-of-charge member and the paid member based on an account ID of a user possessing a device that has requested download of the created program, for example. The processing unit 24 can also discriminate between the free-of-charge member and the paid member based on member information stored in a charging server communicably connected to the external device 20 via the network N, for example.

In this example, the processing unit 24 enables the created program to which the second status information representing "limited publication" or "general publication" is attached and is being published to the outside to be downloaded. That is to say, the processing unit 24 substantially executes the processing to enable the created program to be downloaded based on the first status information stored in the first status information storage unit 23Ba, the second status information stored in the second status information storage unit 23Bb, and the third status information stored in the third status information storage unit 23Bc. That is to say, the created program to which the first status information of "approval" is attached is either "limited publication" or "general publication," and thus the information of "approval" of the first status information doubles as the information of "limited publication" or "general publication" of the second status information. The processing unit 24 does not publish the created program to which the first status information representing "reservation of approval" or "disapproval" is attached or the created program to which the second status information representing "nonpublication" is attached to the outside and disables download. On the other hand, the processing unit 24 publishes the created program to which the first status information representing "approval" is attached and the second status information representing "limited publication" or "general publication" is attached to the outside and enables download in accordance with the contents of the third status information as described above.

Figure 8:
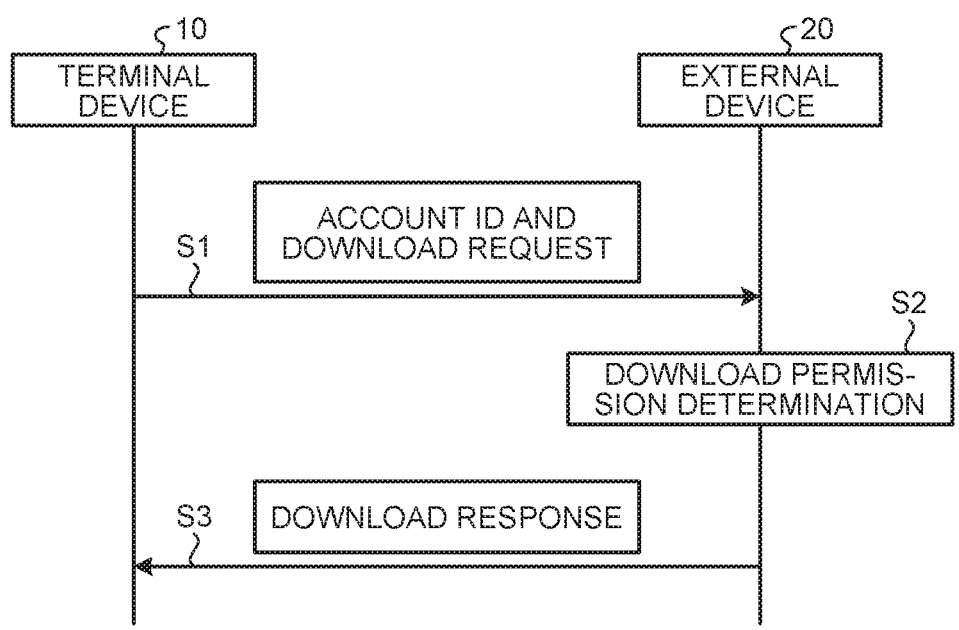
FIG. 8 is a diagram of an exemplary procedure (sequence) of download of a computer program in the program management system according to the embodiment.

The following describes exemplary procedure of download of the created program in the program management system Sys1 with reference to FIG. 8.

The processing unit 16 of the terminal device 10 determines the created program desired to be downloaded in accordance with input to the input unit 13 out of created programs being published to the outside in the external device 20. The processing unit 16 then transmits a download request about the created program determined as above together with the account ID of the user possessing the terminal device 10 to the external device 20 via the communication unit 12 and the network N (Step S1).

The processing unit 24 of the external device 20, upon reception of the account ID of the user and the download request via the communication unit 22, performs download permission determination for the created program according to the download request (Step S2). In this case, the processing unit 24 determines whether download of the created program according to the download request is permitted based on the status information of the created program according to the received account ID and download request.

The processing unit 24 determines whether the user of the terminal device 10 that has transmitted the download request is a publication target of the created program according to the download request based on the received account ID and the second status information, for example. The processing unit 24 determines whether the user of the terminal device 10 that has transmitted the download request is a member type that can download the created program according to the download request based on the received account ID and the third status information, for example. When determining that the user of the terminal device 10 that has transmitted the download request is a publication target of the created program according to the download request and is a member type that can download the created program, the processing unit 24 permits download of the created program. On the other hand, when determining that the user of the terminal device 10 that has transmitted the download request is not a publication target of the created program according to the download request or is not a member type that can download the created program, the processing unit 24 does not permit download of the created program.

The processing unit 24 returns a download response corresponding to the determination result of the download permission determination to the terminal device 10 via the communication unit 22 and the network N (Step S3). In this case, when the determination result of the download permission determination is a determination result of download non-permission, the processing unit 24 causes the display 14a of the terminal device 10 to display a notification that download has not been permitted based on the download response. On the other hand, when the determination result of the download permission determination is a determination result of download permission, the processing unit 24 causes the terminal device 10 to download the created program according to the download request based on the download response.

The processing unit 24 may perform determination of download based on member information stored in the terminal device 10, or specifically at least one piece of information among information on a paid member or a free-of-charge member stored in the terminal device 10, information on whether payment for charging has been made, profile information of a member, and the like. The following describes this configuration in detail.

Figure 9:
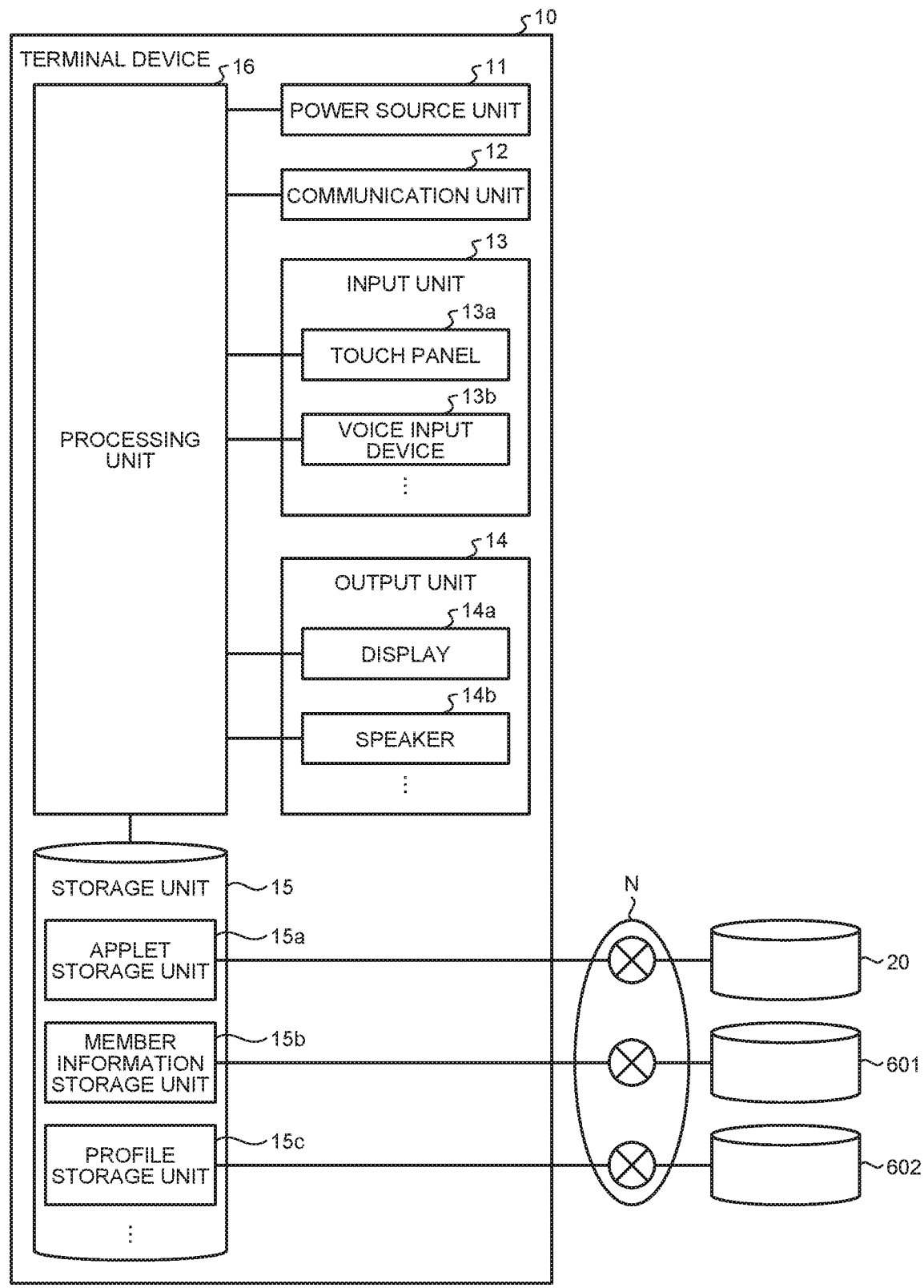
FIG. 9 is a block diagram of another schematic configuration of the terminal device included in the program management system according to the embodiment.

FIG. 9 is a block diagram of a schematic configuration of the terminal device 10 different from that in FIG. 2. The storage unit 15 of this terminal device 10 has an applet storage unit 15a storing therein applets or the like as created programs, a member information storage unit 15b storing therein member information of a user using the terminal device 10, and a profile storage unit 15c storing therein a profile of the user using the terminal device 10.

The applet storage unit 15a stores therein the created program and information thereon. The member information storage unit 15b not only stores therein an account and an ID of a member but also is connected to an external device 601 via the network N to receive information on the user using the terminal device 10, or information on a paid member or a free-of-charge member or information on whether payment for charging has been made, for example, based on control by the processing unit 16 and the communication unit 12 and stores therein the information as the member information. The external device 601 is a device different from the external device 20 and is an exclusive server forming part of the program management system Sys1 and performing management of membership fees of the member and prices on purchase of computer programs. The profile storage unit 15c is connected to an external device 602 via the network N as above and receives profile information on the user using the terminal device 10 such as sex, address, height, weight, age, member account, and ID, and stores therein the profiled information. The external device 602 is a device different from the external devices 20 and 601 and is an exclusive server forming part of the program management system Sys1 and performing management of personal information of the user.

When the user makes a request of download of a desired created program with the terminal device 10, the external device 20 instructs the terminal device 10 to transmit the information on the applet stored in the applet storage unit 15a and the member information stored in the member information storage unit 15b. In response to this, the terminal device 10 transmits at least one piece of information out of the information on the applet of the applet storage unit 15a, the member information of the member information storage unit 15b, and the profile information of the profile storage unit 15c to the external device 20. The external device 20 then determines the appropriateness of download to the terminal device 10 based on the received information. With this operation, the external device 20 can execute the above various kinds of processing by accessing only necessary personal information in the terminal device 10 without accessing the servers high in security.

That is to say, the external devices 601 and 602 each handle personal information and are thus relatively high in security than the external device 20, and there is a tendency that information exchange through direct transmission and reception between the servers is limited. On the contrary, in the above method, the external device 20 accesses only the necessary personal information to obtain information from the external devices 601 and 602 in the terminal device 10 without directly accessing the servers high in security, and the external device 20 can determine the appropriateness of download of the created program to which the third status information representing "paid" is attached. In addition, the appropriateness of download can be determined in a short time, thus also producing an advantage in that the user is not caused to wait for a long time.

When it is determined in the external device 20 that the user who has made a request of download for the created program that only the paid member can download is a free-of-charge member, initial download of the created program may be permitted with use limit set. The user is thereby caused to experience the created program and can be caused to have an interest in joining the paid member.

Management of Computer Program: Display of Use Status

The processing unit 16 of the terminal device 10 can cause the display 14a to display a use status of the created program based on the status information of each created program managed by the external device 20. The processing unit 16 refers to the information stored in the created program storage unit 23A and the fourth status information storage unit 23Bd of the external device 20 via the communication unit 12 and causes the display 14a to display the use status of the created program created by the terminal device 10, for example.

Figure 10:
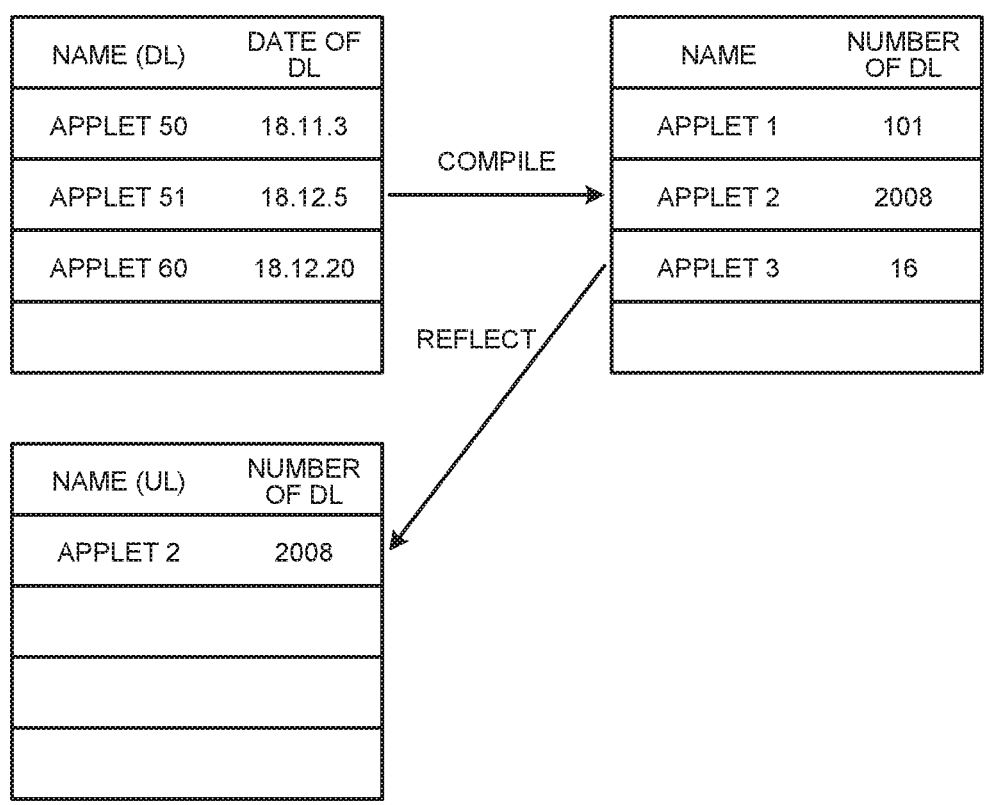
FIG. 10 is a schematic diagram illustrating compilation of information in the program management system according to the embodiment.

In this case, as schematically illustrated in FIG. 10, the processing unit 24 of the external device 20 collects and compiles "number of download," "date and time of download," "success or failure of download," "account ID of using user," "frequency of use," "date and time of use," and the like of the created program stored in the created program storage unit 23A based on an external communication connection status and the like, for example. The processing unit 24 typically collects and compiles "number of download," "date and time of download," "success or failure of download," "account ID of using user," "frequency of use," "date and time of use," and the like of the created program for all users possessing devices communicably connected to the external device 20 via the network N. The processing unit 24 then reflects the compiled use status in the fourth status information stored in the fourth status information storage unit 23Bd.

Figure 11:
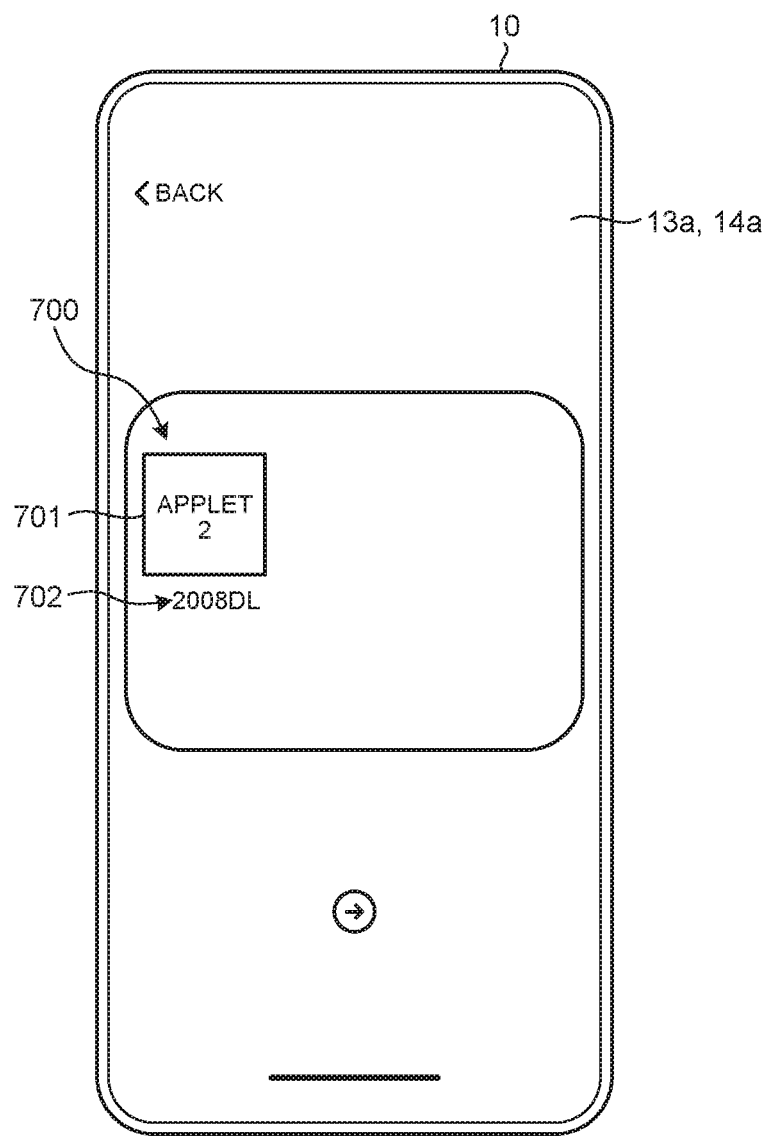
FIG. 11 is a diagram of an exemplary profile screen in the terminal device included in the program management system according to the embodiment.

The processing unit 16 then refers to the fourth status information stored in the fourth status information storage unit 23Bd and causes the display 14a to display an icon image 701 representing the created program created by the user and a fourth status image 702 representing the fourth status information of the created program in a profile screen 700 exemplified in FIG. 11, for example.

The profile screen 700 exemplified in FIG. 11 is a screen displaying personal information on the user possessing the terminal device 10 like the profile screen 500 described above. The profile screen 700 exemplified in FIG. 11 displays the icon image 701 related to the created program uploaded from the terminal device 10 to the external device 20 and the fourth status image 702 as an example. The icon image 701 is an image representing an icon imitating the created program and represents the created program uploaded from the terminal device 10 to the external device 20 in this example. The fourth status image 702 is an image representing contents of the fourth status image of the created program and is a letter image such as "2008DL" meaning that the created program has been downloaded 2,008 times in this example. The processing unit 16 displays the fourth status image 702 with a letter image of "2008DL" at a lower corner of the icon image 701 of the created program in the profile screen 700 exemplified in FIG. 11. With this operation, the terminal device 10 can provide a notification about the use status of the created program managed by the external device 20 in an easy-to-understand way.

Management of Computer Program: Reward Calculation

The processing unit 24 of the external device 20 can execute processing to calculate a reward for the created program based on the fourth status information compiled as described above and stored in the fourth status information storage unit 23Bd. The processing unit 24 calculates a reward (an amount of money or a point) for the creator of each created program in accordance with "number of download," "frequency of use," or the like based on the meta-information and each fourth status information connected with the created program stored in the created program storage unit 23A, for example.

The processing unit 24 may cause the storage unit 23 to store therein the calculated reward for the creator of each created program or cause a charging server or the like communicably connected to the external device 20 via the network N to store the reward.

Effects of Embodiment

The program management system Sys1, the external device 20, and the terminal device 10 described in the foregoing transmit the computer program created by the terminal device 10 to the external device 20 and stores the created program transmitted from the terminal device 10 to the external device 20 in the external device 20. The program management system Sys1 causes the external device 20 to execute the processing to give approval to the computer program and stores the appropriateness of approval of the computer program as the first status information together with the computer program in the external device 20. The external device 20 manages the computer program based on the first status information. Consequently, the program management system Sys1, the external device 20, and the terminal device 10 can appropriately manage the computer program created by the terminal device 10 by the external device 20.

The program management system Sys1, the external device 20, and the terminal device 10 described in the foregoing cause the display 14*a* to display the icon images 501, 502, and 503 of the respective computer programs and the first status images 504, 505, and 506 of the respective computer programs by the processing unit 16, for example. Consequently, the program management system Sys1, the external device 20, and the terminal device 10 can provide a notification about the status of the approval examination of the created program created by the terminal device 10 and managed by the external device 20 in an easy-to-understand way.

The program management system Sys1, the external device 20, and the terminal device 10 described in the foregoing store, in the external device 20, the computer program together with the second status information representing the degree of publication of the computer program to the outside. The program management system Sys1, the external device 20, and the terminal device 10 can execute the processing to publish the computer program to the outside based on the first status information and the second status information by the processing unit 24 of the external device 20, for example. Consequently, the program management system Sys1, the external device 20, and the terminal device 10 can publish an appropriate computer program that has been approved to the outside based on management by the external device 20.

The program management system Sys1, the external device 20, and the terminal device 10 described in the foregoing store, in the external device 20, the computer program together with the third status information representing the charging contents of the computer program. The program management system Sys1, the external device 20, and the terminal device 10 can execute the processing to enable the computer program to be downloaded based on the first status information and the third status information by the processing unit 24 of the external device 20, for example. Consequently, the program management system Sys1, the external device 20, and the terminal device 10 can enable the computer program to be downloaded in accordance with the charging contents based on management by the external device 20.

The program management system Sys1, the external device 20, and the terminal device 10 described in the foregoing store, in the external device 20, the computer program together with the fourth status information representing the use status of the computer program. The program management system Sys1, the external device 20, and the terminal device 10 can execute the processing to calculate the reward for the computer program based on the fourth status information by the processing unit 24 of the external device 20, for example. Consequently, the program management system Sys1, the external device 20, and the terminal device 10 can manage the computer program by the external device 20 including the reward corresponding to the use status of the computer program.

In the program management system Sys1, the external device 20, and the terminal device 10 described in the foregoing, the software program to be managed is the service block, the trigger block, the action block, or the applet that are relatively small in data amount. In this case, the program management system Sys1, the external device 20, and the terminal device 10, even when transmitting all computer programs requiring various processing such as the approval examination from the terminal device 10 to the external device 20 without any preliminary examination by the terminal device 10 and processing the computer programs by the external device 20, can reduce the possibility of bringing about an excessive increase in data communication amount, an excessive increase in calculation amount by the external device 20, pressing of storage capacity, and the like, for example.

The program management system, the external device, and the terminal device according to the embodiment of the present invention described above are not limited to the embodiment described above, and various modifications can be made within the range described in what is claimed.

Although the foregoing description states that the software program created by the terminal device 10 and to be managed by the external device 20 is a computer program that is executed by each device to be operated to operate the device to be operated, this is not limiting. Although it is stated that the software program is the service block, the trigger block, the action block, or the applet, this is not limiting.

Although the foregoing description states that the storage unit 23 stores therein the first status information, the second status information, the third status information, and the fourth status information, whereas the processing unit 24 manages the created program based on the first status information, the second status information, the third status information, and the fourth status information, this is not limiting. The storage unit 23 may store therein at least the first status information, whereas the processing unit 24 may manage the computer program at least based on the first status information. The processing unit 24 may execute the processing to enable the computer program to be downloaded based on the first status information and second status information regardless of the third status information representing the charging contents of the computer program, for example. Further, the processing unit 24 may execute the processing to publish the computer program and the processing to enable the computer program to be downloaded only based on the first status information regardless of the second status information representing the degree of publication of the computer program to the outside.

Although the foregoing description states that the first status image is a letter image such as "APPROVED," "DISAPPROVED," or "RESERVED," this is not limiting; the first status image may be a figure image imitating various motifs.

Although the foregoing description states that the external device 20 is formed as a single device, this is not limiting. The form of the functional distribution of the external device 20 is not limited to the above and can be formed functionally or physically distributing and consolidating any units to the extent that similar effects and functions can be produced. Various kinds of computer programs other than the created program described in the foregoing, various kinds of data, and the like may be updated as appropriate or stored in another server connected to the terminal device 10 or the external device 20 via any network N. The computer programs other than the created program described in the foregoing, the various kinds of data, and the like can also be executed by being recorded in a computer-readable medium such as a hard disk, a flexible disk (FD), a compact disc read only memory (CD-ROM), a magneto-optical (MO), or a digital versatile disc (DVD) and being read from the recording medium by a computer.

The whole or any part of the processing functions of the processing units 16 and 24, for example, may be implemented by a CPU or the like and a computer program interpreted and executed by the CPU or the like or implemented as hardware with a wired logic or the like, for example.

Modification of Management of Computer Program: Update after Publication

Although the above description states that the processing unit 24 can execute the processing to publish the created program to the outside based on the first status information and the second status information, publication may be limited afterward.

The processing unit 24 according to the present modification, when the first status information or the second status information is updated, can execute processing to limit publication of the created program that has been published to the outside based on update contents of the first status information or the second status information, for example.

Examples of the case in which the first status information or the second status information is updated after publication of the created program to make the created program nonpublication include a case in which criteria for the approval examination of the created program (the rules for approving publication of the created program) have been changed, and the created program has become not to satisfy the approval criteria to be "disapproved" afterward and a case in which the created program that has been made "publication" has been made "nonpublication" afterward by a creator's intention.

To address such cases, the processing unit 24 according to the present modification limits publication and download of the created program that has been published to the outside based on the update contents of the first status information or the second status information. When, in the created program to which the first status information representing "approval" is attached, the first status information is changed to "disapproval" afterward, for example, the processing unit 24 limits publication of the created program that has been published to the outside. Similarly, when, in the created program to which the second status information representing "publication" is attached, the second status information is changed to "nonpublication" afterward, for example, the processing unit 24 limits publication of the created program that has been published to the outside.

In this case, the processing unit 24 according to the present modification, after executing the processing to limit publication of the computer program, can execute processing to limit use of the created program for a device that has already stored therein the created program. This processing, in other words, corresponds to post-publication use limitation processing, which, when the first status information or the second status information is updated to make the created program nonpublication afterward, limits use and the like of the created program. With this processing, the program management system Sys1 according to the present modification, even when publication of the created program is limited afterward, can appropriately manage the created program.

Figure 12:
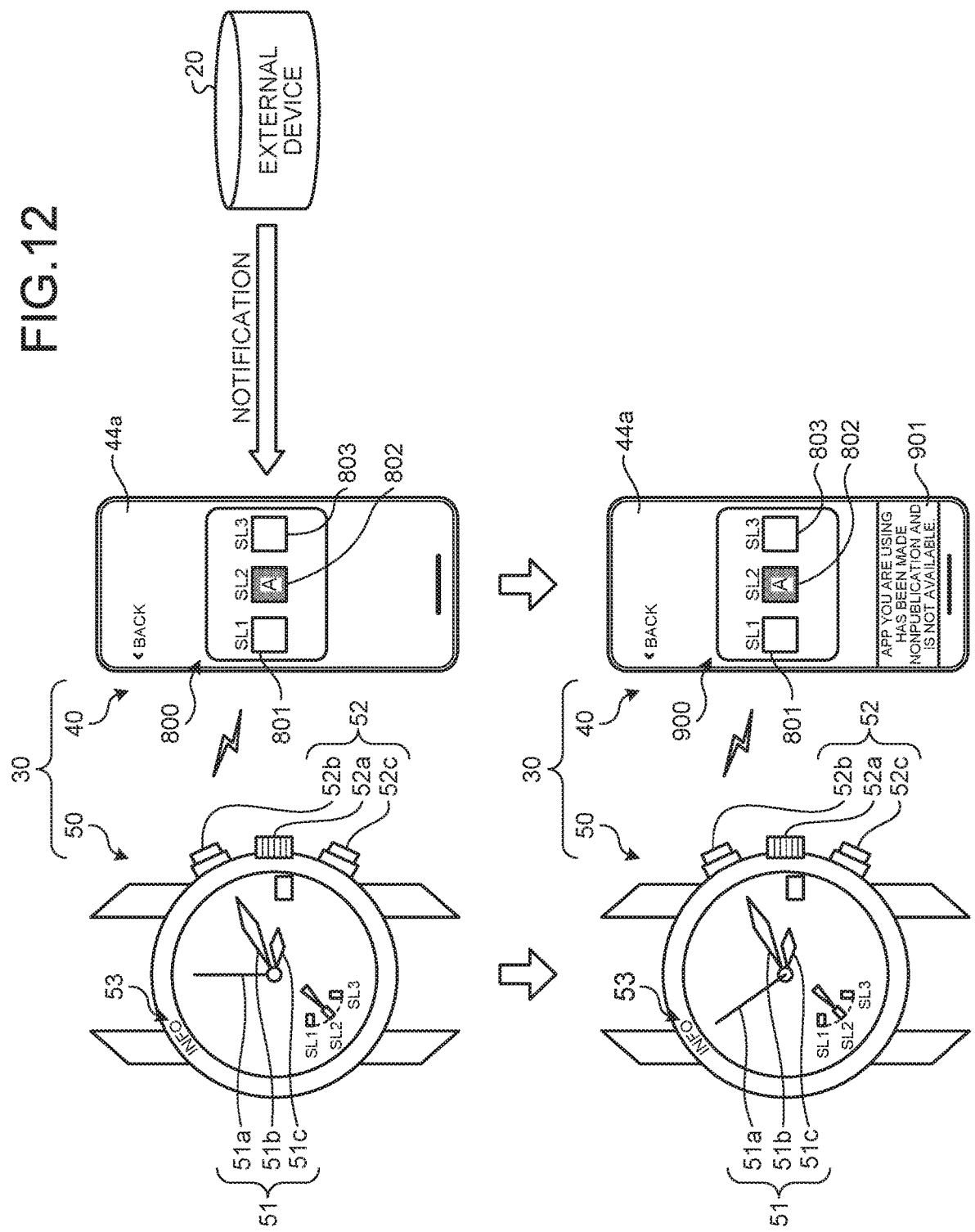
FIG. 12 is a schematic diagram illustrating exemplary processing when publication of a created program is limited afterward in the program management system according to a modification.

Examples of the device that has already stored therein the created program the use of which is limited afterward include a device 30 to be operated illustrated in FIG. 12. The device 30 to be operated is typically an electronic device that operates by executing the created program managed by the program management system Sys1. The device 30 to be operated exemplified in FIG. 12 includes a first device 40 to be operated and a second device 50 to be operated, for example.

The first device 40 to be operated is an electronic device portable by a user and is the device 30 to be operated as a master that mutually communicates and cooperates with the external device 20 and can thereby receive various services from the external device 20. The first device 40 to be operated can include a smartphone, a tablet PC, a notebook PC, a PDA, or a portable game machine, for example. The example in FIG. 12 illustrates the first device 40 to be operated as being a smartphone, which is substantially similar to the terminal device 10 described above in configuration, and a detailed description thereof is omitted.

The second device 50 to be operated is an electronic device portable by the user and is the device 30 to be operated as a slave that mutually communicates and cooperates with the first device 40 to be operated and can thereby receive various services together with the first device 40 to be operated. The second device 50 to be operated of the present modification is communicably paired with the first device 40 to be operated in accordance with various paring operations. The second device 50 to be operated can include a smartphone, a tablet PC, a notebook PC, a PDA, or a portable game machine, for example, and preferably includes a wearable device smaller in size than the first device 40 to be operated and wearable on a human body in this example. Examples of the wearable device include devices such as a wristband type one, an eye glasses type one, a ring type one, a shoe type one, and a pendant type one.

The example in FIG. 12 illustrates the second device 50 to be operated as being an electronic watch (a watch) that is a wristband type wearable device to be worn on an arm and displays time. The second device 50 to be operated illustrated in FIG. 12 is an analog electronic watch (an analog quartz watch), which indicates an index (a scale) of a dial with physical hands 51 (a second hand 51a, a minute hand 51b, and an hour hand 51c) to display time. The second device 50 to be operated, which is not limited to this example, may be a digital electronic watch (a digital quartz watch), which displays time in digital form, a combination electronic watch (a combination quartz watch), which includes digital display together with analog hand display, or the like.

The second device 50 to be operated includes an operation unit 52. The operation unit 52 is a part receiving external operation by the user or the like as various input to the second device 50 to be operated. The operation unit 52 includes a crown 52a and push buttons 52b and 52c provided protruding from an outer circumferential face of an exterior case, for example. In accordance with pulling and rotational operations on the crown 52a and a pressing operation on the push buttons 52b and 52c, parts within the exterior case operate in conjunction with each other, causing the operation unit 52 to receive various operations. In addition, the operation unit 52 may include a register ring.

The processing unit 24, after executing the processing to limit publication of the computer program, executes processing for the device 30 to be operated (the first device 40 to be operated and the second device 50 to be operated) that has already stored therein the created program to limit use of the created program, for example.

In this case, the processing unit 24, after executing the processing to limit publication of the computer program, can execute processing to notify the device 30 to be operated (the first device 40 to be operated and the second device 50 to be operated) that has already stored therein the created program of limitation of use of the created program, for example. This processing, in other words, corresponds to post-publication use limitation notification processing, which, when the first status information or the second status information is updated to make the created program nonpublication afterward, provides a notification that publication of the created program has been limited.

The processing unit 24, after the first status information or the second status information has been updated and executing the processing to limit publication of the created program, transmits a notification about limitation of use of the created program to the first device 40 to be operated that has already stored therein the created program via the communication unit 22, for example. The processing unit 24 refers to a download history or the like of each created program stored in the storage unit 23 to identify the first device 40 to be operated that has already stored therein the created program and transmits the notification to the identified first device 40 to be operated, for example.

The first device 40 to be operated, upon reception of the notification about limitation of use of the created program from the external device 20, causes a display 44*a* to display a notification screen 800 exemplified in FIG. 12, for example, based on the received notification.

The notification screen 800 exemplified in FIG. 12 is a screen providing a notification that use of the created program that has already been stored in the first device 40 to be operated has been limited. The notification screen 800 exemplified in FIG. 12 displays icon images 801, 802, and 803 about created programs downloaded from the external device 20 to the first device 40 to be operated as an example. The icon images 801, 802, and 803 are images representing icons imitating the respective created programs and in this example represent created programs stored in a plurality of respective storage areas (slots "SL1, SL2, and SL3") prepared in the first device 40 to be operated in advance.

The first device 40 to be operated, in the notification screen 800, distinguishes the icon image of the created program that has been limited in use, or the icon image 802 of the created program stored in the slot SL2 in the example in FIG. 12, for example, from the other icon images 801 and 803 in display mode to provide a notification that use of the created program has been limited.

In this process, the first device 40 to be operated may also notify the second device 50 to be operated, which is paired with the first device 40 to be operated, of the fact that use of the created program has been limited afterward. In this case, the second device 50 to be operated may indicate a certain position, or a lettering 53 of "INFO" representing "INFORMATION" in this example, by the second hand 51*a* as illustrated in the lower row in FIG. 12 to provide a notification to urge the user to look at the first device 40 to be operated, for example. A certain acknowledgement operation, or a pressing operation on the push buttons 52*b* and 52*c*, for example, is performed, whereby the second device 50 to be operated returns the second hand 51*a* to its original position (the 12 o'clock position, for example) and transmits the fact that the certain acknowledgement operation has been performed on the first device 40 to be operated.

The first device 40 to be operated causes the display 44*a* to display a notification screen 900 exemplified in FIG. 12, for example, with the certain acknowledgement operation in the second device 50 to be operated as a trigger. The notification screen 900 is a screen substantially similar to the notification screen 800 described above but is different from the notification screen 800 in that a nonpublication notification display area 901 is also displayed in addition to the above. The nonpublication notification display area 901 is an area displaying a message that provides notification that the created program has been made nonpublication afterward and use thereof has been limited and displays a letter image such as "App you are using has been made nonpublication and is not available." as an example.

The processing unit 24 then compulsorily deletes the created program that has been limited in use from the first device 40 to be operated or causes the first device 40 to be operated not to execute the created program to limit use of the created program.

The processing unit 24, when causing the first device 40 to be operated to display the program store or the like or staring up a certain program management application, may cause the first device 40 to be operated to perform display such as the notification screens 800 and 900 to compulsorily reflect the update contents of the first status information or the second status information, for example. The processing unit 24, when the first status information or the second status information is updated, may transmit the notification described above to the first device 40 to be operated through what is called push communication. The processing unit 24 may transmit the notification described above to a mail address registered in connection with the user in advance. Although it is stated that the second device 50 to be operated, when the notification to urge the user to look at the first device 40 to be operated is performed, indicates the lettering 53 of "INFO" by the second hand 51*a*, this is not limiting; the second hand 51*a* may indicate a lettering of "ERR" (not illustrated) representing "ERROR," for example.

The processing unit 24, when limiting use of the created program, after executing the processing to notify the device (the device 30 to be operated or the like) that has already stored therein the created program of limitation of use of the created program, can execute processing to present to the device a created program as an alternative to the created program that has been limited in use. This processing, in other words, corresponds to alternative program presentation processing, which presents a created program as an alternative when publication of the created program is limited.

In this case, the processing unit 24 extracts a created program similar to the created program that has been limited in use and has been deleted from the first device 40 to be operated from the created programs stored in the created program storage unit 23A, for example. The created program similar thereto is a created program including any items similar to those of the created program that has been limited in use in terms of genre, category, function, use, or the like, for example.

The processing unit 24 presents the extracted created program as the created program alternative to the created program that has been limited in use to the first device 40 to be operated. The processing unit 24, when causing the first device 40 to be operated to display the program store or the like or staring up the certain program management application, performs display to present the extracted created program on the display 44*a*, for example. With this operation, the program management system Sys1 can facilitate another download of the created program similar to the created program that has been limited in use as the alternative created program.

The program management system Sys1, the external device 20, and the terminal device 10 according to the modification described in the foregoing can execute processing to limit publication of the created program that has already been published based on the update contents of the first status information or the second status information. Consequently, the program management system Sys1, the external device 20, and the terminal device 10, even when publication of the created program is limited afterward, can appropriately manage the created program.

The program management system Sys1, the external device 20, and the terminal device 10 according to the modification described in the foregoing can execute processing to limit use of the created program for the device that has already stored therein the created program. Consequently, the program management system Sys1, the external device 20, and the terminal device 10 can prevent the created program that has been limited in publication afterward from being continuously used and can thus appropriately manage the created program.

In this case, the program management system Sys1, the external device 20, and the terminal device 10 according to the modification described in the foregoing can execute processing to notify the device that has already stored therein the created program of limitation of use of the created program. Consequently, the program management system Sys1, the external device 20, and the terminal device 10 can provide a notification that the created program that has been limited in publication afterward will become unavailable and can prevent the user from being given an impression as if the created program has suddenly become unavailable, for example.

The program management system Sys1, the external device 20, and the terminal device 10 according to the modification described in the foregoing can execute processing to present a computer program as an alternative to the created program that has been limited in use, to the device that has already stored therein the created program. Consequently, the program management system Sys1, the external device 20, and the terminal device 10 can facilitate another setting of the created program similar to the created program that has been limited in use as the alternative created program smoothly without troubling the user.

Modification of Status Information of Computer Program: Fifth Status Information Although the foregoing description states that the storage unit 23 of the external device 20 stores therein the first status information, the second status information, the third status information, and the fourth status information as the status information of the created program, this is not limiting. The storage unit 23 may further store therein another status information in addition to the first status information, the second status information, the third status information, and the fourth status information. The processing unit 24 may manage the created program further based on the other status information in addition to the first status information, the second status information, the third status information, and the fourth status information.

Figure 13:
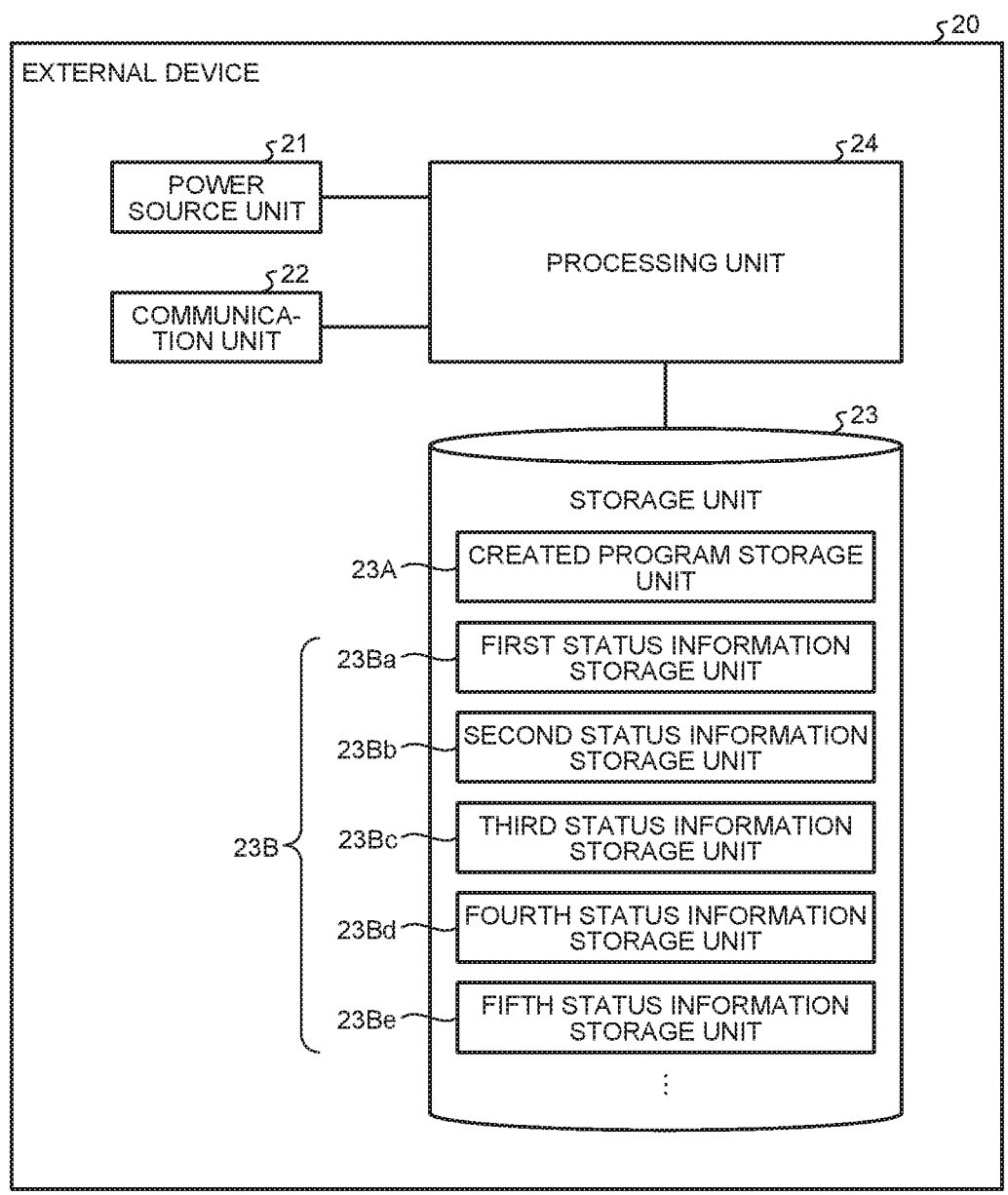
FIG. 13 is a block diagram of a schematic configuration of the external device included in the program management system according to the modification.

The storage unit 23 according to a modification illustrated in FIG. 13 further stores therein fifth status information in addition to the first status information, the second status information, the third status information, and the fourth status information as the status information. That is to say, the storage unit 23 of the present modification can store therein the created program together with the first status information, the second status information, the third status information, the fourth status information, and the fifth status information.

In this example, the status information storage unit 23B of the storage unit 23 further includes a fifth status information storage unit 23Be storing therein the fifth status information in addition to the first status information storage unit 23Ba, the second status information storage unit 23Bb, the third status information storage unit 23Bc, and the fourth status information storage unit 23Bd.

The fifth status information storage unit 23Be is a storage area storing therein the fifth status information as the status information. The fifth status information is information representing a user who can use the created program and is information representing "user identification information (account ID of user or the like)" for identifying a user who is invited to the created program and is permitted to use it or the like, for example. In other words, the fifth status information can also be regarded as information representing a user to be invited to the created program. The fifth status information is selected by the creator via a selection screen or the like on the terminal device 10 and is attached to the created program by the processing unit 16 of the terminal device 10 like the second status information, the third status information, and the like described above.

Figure 14:
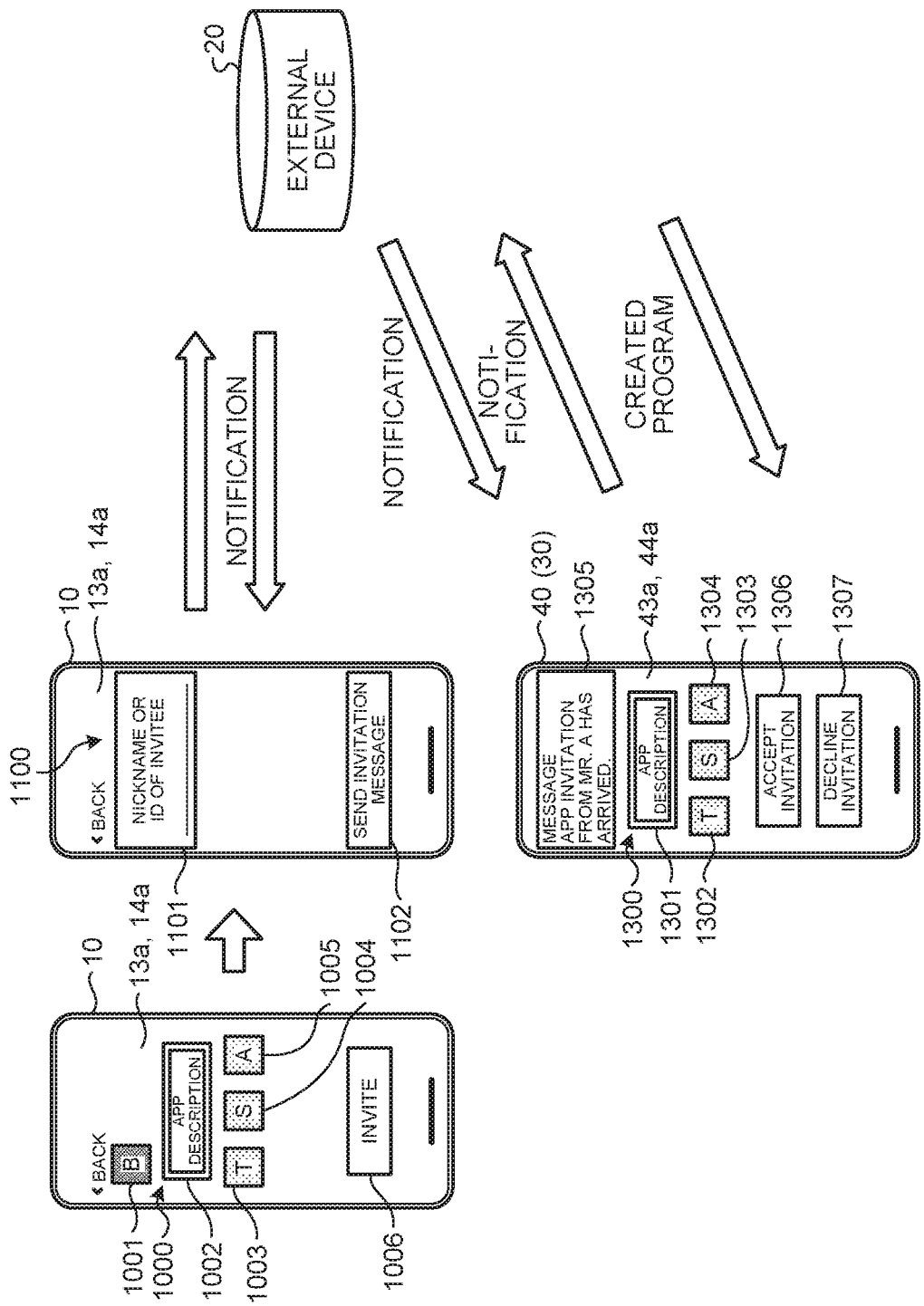
FIG. 14 is a schematic diagram illustrating exemplary processing when a certain user is invited to a created program in the program management system according to the modification.

As an example, the processing unit 16, after creation of the created program, can cause the creator to select the fifth status information on the created program via selection screens 1000 and 1100 in FIG. 14, for example. The processing unit 16 may cause the creator to select the fifth status information for the created program by leading the creator to the selection screens 1000 and 1100 in FIG. 14 in accordance with an operation to select a certain created program on a management screen of the created program.

The processing unit 16, after completion of creation of the created program or after a selection operation of the certain created program on the management screen, causes the display 14a to display the selection screen 1000 exemplified in FIG. 14, for example. The selection screen 1000 exemplified in FIG. 14 is a screen operated in order to select whether a certain user is invited to the created program. The selection screen 1000 displays an invitation selection area 1006 together with an icon image 1001 representing the created program, a letter image 1002 describing an outline of the created program, an icon image 1003 representing the trigger block forming the created program, an icon image 1004 representing the service block, an icon image 1005 representing the action block, and the like, for example. The invitation selection area 1006 is an area selected when the certain user is invited to the created program and displays a letter image such as "INVITE" as an example.

The processing unit 16, when the invitation selection area 1006 is selected in accordance with the tap operation or the like by the creator on the touch panel 13a in the selection screen 1000 exemplified in FIG. 14, causes the display 14a to display the selection screen 1100 exemplified in FIG. 14, for example. The selection screen 1100 exemplified in FIG. 14 is a screen operated in order to select information on the user to be invited to the created program, that is, the fifth status information. The selection screen 1100 displays an invitee selection area 1101 and a message transmission selection area 1102, for example. The invitee selection area 1101 is an area selected in order to identify the fifth status information including "user identification information (account ID of user or the like)" representing the user to be invited and displays a blank image together with a letter image such as "NICKNAME OR ID OF INVITEE" as an example. The message transmission selection area 1102 is an area selected when a message is transmitted to the user to be invited and displays a letter image such as "SEND INVITATION MESSAGE" as an example.

The processing unit 16, when the invitee selection area 1101 is selected in accordance with the tap operation or the like by the creator on the touch panel 13a in the selection screen 1100 exemplified in FIG. 14, displays what is called a software keyboard within the selection screen 1100 and receives an input operation of "user identification information" by the creator via the touch panel 13a, for example.

The processing unit 16, when the message transmission selection area 1102 is selected in accordance with the tap operation or the like by the creator on the touch panel 13a in the selection screen 1100 exemplified in FIG. 14, displays what is called a software keyboard within the selection screen 1100 and receives an input operation of "transmission message" by the creator via the touch panel 13a, for example.

The processing unit 16, when various kinds of input operations by the creator end in the selection screen 1100 illustrated in FIG. 14, attaches the fifth status information including "user identification information" and "transmission message" to the created program. The processing unit 16 then stores the created program to which the fifth status information has been attached together with the other various kinds of information described above in the storage unit 15 and transmits and uploads the created program to the external device 20.

The storage unit 23 of the external device 20 stores therein the created program together with the first status information, the second status information, the third status information, the fourth status information, and the fifth status information. The fifth status information stored in the fifth status information storage unit 23Be is stored in association (connection) with the created program and its meta-information stored in the created program storage unit 23A through processing by the processing unit 24 like the other status information. The processing unit 24 can execute processing to manage the created program based on the first status information, the second status information, the third status information, the fourth status information, and the fifth status information.

FIG. 15 is an exemplary created program list 1200 obtained by making a plurality of created programs into a list and a database by the processing unit 24 like FIG. 6 described above. The created program list 1200 exemplified in FIG. 15 is different from the created program list 400 exemplified in FIG. 6 in that a list about the fifth status information is added.

The created program list 1200 illustrated in FIG. 15 includes "invitation" in addition to "name," "creator," "account ID of creator," "examination status," "publication," and "date of application" of the created programs made into a list based on the first status information, the second status information, the fifth status information, and the meta-information stored in the created program storage unit 23A, the first status information storage unit 23Ba, the second status information storage unit 23Bb, and the fifth status information storage unit 23Be, respectively, as an example. "Invitation" is based on the fifth status information of the created program and represents "user identification information" to be invited to the created program, for example. The created program list 1200 can be displayed on the display unit (not illustrated) of the external device 20 or the device for management, for example.

The processing unit 24 can execute processing to publish the created program to the outside based on the first status information stored in the first status information storage unit 23Ba, the second status information stored in the second status information storage unit 23Bb, the fifth status information stored in the fifth status information storage unit 23Be, for example. The processing unit 24, when publishing the created program to which the first status information representing "approval" is attached and to which the second status information representing "limited publication" is attached to the outside, can limit its publication target to a user corresponding to "user identification information" represented by the fifth status information attached to the created program, without publication to the other users, for example. That is to say, the processing unit 24 causes a device (the terminal device 10 or the first device 40 to be operated described above, for example) possessed by the user corresponding to "user identification information" represented by the fifth status information to display the created program as a downloadable created program in the program store or the like but, on the other hand, does not cause a device possessed by another user to display the created program as a downloadable created program in the program store or the like, for example.

In other words, the processing unit 24 can execute the processing to enable the created program to be downloaded based on first status information stored in the first status information storage unit 23Ba and the fifth status information stored in the fifth status information storage unit 23Be, for example. That is to say, for the created program to which the first status information representing "approval" is attached and to which the fifth status information is attached, the processing unit 24 enables the created program to be downloaded to the device possessed by the user corresponding to "user identification information" represented by the fifth status information and disables download for the device possessed by the other user.

In this case, for the created program to which the second status information representing "limited publication" is attached and to which the fifth status information is also attached, the processing unit 24 eventually enables the created program to be downloaded limitedly to the user corresponding to "user identification information" represented by the fifth status information. That is to say, the processing unit 24 substantially executes the processing to enable the created program to be downloaded based on the first status information stored in the first status information storage unit 23Ba, the second status information stored in the second status information storage unit 23Bb, and the fifth status information stored in the fifth status information storage unit 23Be.

Further, as described above, the processing unit 24 can execute the processing to enable the created program to be downloaded also based on the third status information in addition to the first status information and the fifth status information.

As exemplified in FIG. 14, the processing unit 24 according to the present modification can execute processing to notify a device associated with the user who can use the created program of availability of the created program based on the fifth status information. This processing, in other words, corresponds to invitation processing, which notifies the user who can use the created program of invitation to the created program.

Further, the processing unit 24, after executing the processing to notify the device associated with the user who can use the created program of availability of the created program, can execute processing to download the created program to the device when an operation to accept use of the created program is performed in the device.

The device associated with the user is a device possessed by the user and is the terminal device 10 or the first device 40 to be operated described above, for example. The example in FIG. 14 illustrates the device associated with the user as being the first device 40 to be operated.

In this case, the processing unit 24 transmits a notification about availability of the created program to the first device 40 to be operated associated with the user via the communication unit 22 based on "user identification information" represented by the fifth status information and the like, for example. The first device 40 to be operated, upon reception of the notification about availability of the created program from the external device 20, causes the display 44*a* to display a notification screen 1300 exemplified in FIG. 14, for example, based on the received notification.

The notification screen 1300 exemplified in FIG. 14 is a screen providing a notification that the user associated with the first device 40 to be operated has been invited to the created program in accordance with the fifth status information. The notification screen 1300 displays a message display area 1305, an invitation acceptance selection area 1306, and an invitation decline selection area 1307 together with a letter image 1301 describing an outline of the created program to which the user has been invited, an icon image 1302 representing the trigger block forming the created program to which the user has been invited, an icon image 1303 representing the service block, and an icon image 1304 representing the action block, for example. The message display area 1305 is an area displaying a message providing a notification that the user has been invited to the created program and displays a letter image such as "Message App invitation from Mr. A has arrived." as an example.

The message displayed in the message display area 1305 may be "transmission message" input by the creator of the created program in the selection screen 1100 exemplified in FIG. 14, for example. The information on "transmission message" is included in the fifth status information. The invitation acceptance selection area 1306 is an area selected when the invitation to the created program is accepted and displays a letter image such as "ACCEPT INVITATION" as an example. The invitation decline selection area 1307 is an area selected when the invitation to the created program is declined and displays a letter image such as "DECLINE INVITATION" as an example.

The first device 40 to be operated, when the invitation acceptance selection area 1306 is selected in accordance with a tap operation or the like by the user on a touch panel 43*a* in the notification screen 1300 exemplified in FIG. 14, transmits a notification that the invitation to the created program has been accepted, to the external device 20, for example. The operation to select the invitation acceptance selection area 1306 corresponds to the operation to accept use of the created program in the first device 40 to be operated described above.

The processing unit 24, upon reception of the notification that the invitation to the created program has been accepted, from the first device 40 to be operated, causes the first device 40 to be operated to display the created program as the downloadable created program in the program store or the like as described above. The processing unit 24, when a final download operation is performed in the first device 40 to be operated, downloads the created program to which the user has been invited, to the first device 40 to be operated.

In this case, the processing unit 24, upon completion of download of the created program to which the user has been invited, to the first device 40 to be operated, may execute processing to transmit a notification that the user has accepted the invitation, to the terminal device 10 of the creator of the created program via the communication unit 22.

On the other hand, the first device 40 to be operated, when the invitation decline selection area 1307 is selected in accordance with the tap operation or the like by the user on the touch panel 43*a* in the notification screen 1300 exemplified in FIG. 14, transmits a notification that the invitation to the created program is declined, to the external device 20, for example.

The processing unit 24, upon reception of the notification that the invitation to the created program is declined, from the first device 40 to be operated, executes processing to store therein that the invitation has been declined for the created program in association with the fifth status information and the like. In this case, the processing unit 24 may perform processing to delete the fifth status information itself attached to the created program. Further, the processing unit 24 may execute processing to transmit a notification that the invited user has declined the invitation to the terminal device 10 of the creator of the created program via the communication unit 22.

The program management system Sys1, the external device 20, and the terminal device 10 according to the modification described in the foregoing store, in the external device 20, the computer program together with the fifth status information representing the user who can use the created program. The program management system Sys1, the external device 20, and the terminal device 10 can execute the processing to enable the created program to be downloaded based on the fifth status information by the processing unit 24 of the external device 20, for example. Consequently, the program management system Sys1, the external device 20, and the terminal device 10 can enable the created program to be downloaded limitedly to the user defined in advance by the fifth status information.

The program management system Sys1, the external device 20, and the terminal device 10 according to the modification described in the foregoing can execute the processing to notify the device associated with the user who can use the created program of availability of the created program based on the fifth status information. Consequently, the program management system Sys1, the external device 20, and the terminal device 10 can invite the user who can use the created program to the created program.

The program management system Sys1, the external device 20, and the terminal device 10 according to the modification described in the foregoing, when the operation to accept use of the computer program is performed in the device associated with the user who can use the created program, can execute the processing to download the created program to the device. Consequently, the program management system Sys1, the external device 20, and the terminal device 10 can smoothly download the created program to the device associated with the user who has accepted the invitation to the created program.

As in the foregoing, the program management system Sys1, the external device 20, and the terminal device 10 according to the modification can smoothly perform the processing to invite the user to the created program and to cause the user to download the created program without troubling the user.

Modification of Approval Examination: Automatic Reinput at Time of Reapplication In the foregoing description, the processing unit 24, when the created program has not been "approved", that is, "disapproval" or "reservation of approval" as the result of the approval examination of the created program, may notify the terminal device 10 of the result of the approval examination and encourage reexamination. In this case, the processing unit 24 transmits the result of the approval examination of the created program to the terminal device 10 via the communication unit 22. The processing unit 16 of the terminal device 10, upon reception of the result or message of the approval examination of the created program from the external device 20 via the communication unit 12, may cause the display 14a to display a notification screen 1400 exemplified in FIG. 16 based on the received result or message of the approval examination.

Figure 16:
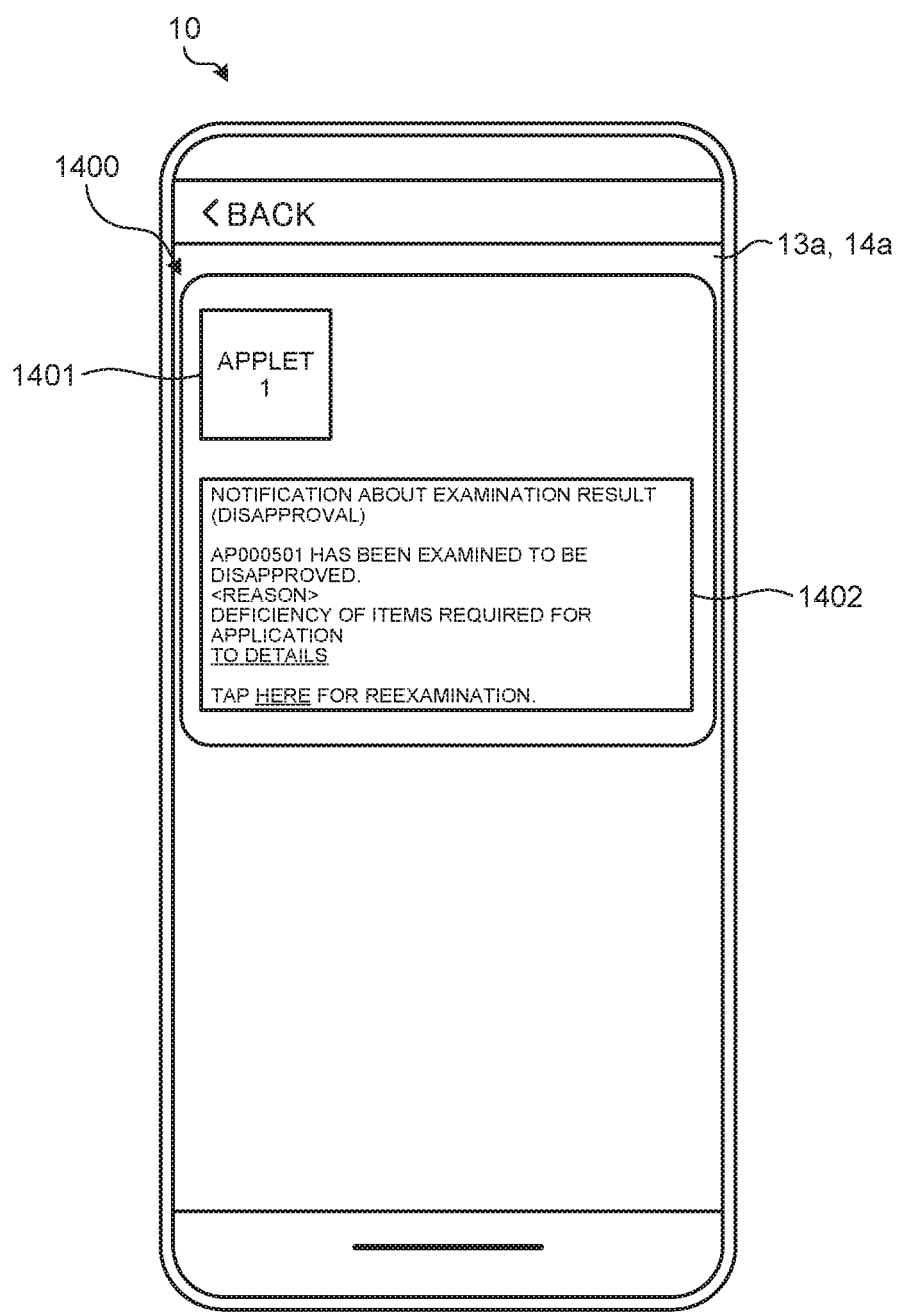
FIG. 16 is a diagram of an exemplary notification screen of a result of an approval examination in the terminal device included in the program management system according to the modification.

The notification screen 1400 exemplified in FIG. 16 is a screen providing a notification about the result of the approval examination of the created program. The notification screen 1400 exemplified in FIG. 16 represents a screen when the created program has been "disapproved" as an example and displays an examination result display area 1402 together with an icon image 1401 about the created program that has been "disapproved." The icon image 1401 is an image representing an icon imitating the created program that has been "disapproved." The examination result display area 1402 is an area displaying the result of the approval examination of the created program and displays letter images such as "Notification about examination result (disapproval)," "AP000501 has been examined to be disapproved.," "<Reason> Deficiency of items required for application [to details]," and "Tap here for reexamination." as an example.

The processing unit 16, when "[to details]" is selected in accordance with the tap operation or the like by the creator on the touch panel 13a in the notification screen 1400 exemplified in FIG. 16, causes the display 14a to display a detailed screen of the deficiency of items required for application, or details of failed items A1, A2, A3, A4, and A5 described below, for example. In accordance therewith, the creator of the created program can grasp detailed information on the failed items and perform measures such as a revision of the created program.

The processing unit 16, when "[here]" is selected in accordance with the tap operation or the like by the creator on the touch panel 13a in the notification screen 1400 exemplified in FIG. 16, causes the display 14a to display an application screen for reexamination.

In approval application of the created program, the communication unit 12 of the terminal device 10 transmits to the external device 20 the created program together with the application information input to the terminal device 10. The application information transmitted from the terminal device 10 to the external device 20 is information that has been input to the terminal device 10 via the input unit 13 in the terminal device 10 in order to be used for the approval examination of the created program by the external device 20. The application information includes the meta-information described above, for example, and in addition includes an icon image representing the created program, the created program main body, text information on specifications, an icon image representing operation contents, and text information on contents description.

The processing unit 24 of the present modification, when the created program has not been approved, and when the display 14a is caused to display the application screen for reexamination as described above, can execute processing to change items to be automatically reinput in the terminal device 10 as the application information in accordance with an item that has not been approved. The processing unit 24 once stores items input at the time of initial application in connection with the applied created program, the account ID of the creator, and the like in the storage unit 23 and at the time of application of reexamination reads the items input at the time of the initial application from the storage unit 23 as needed and automatically reinputs the items as the application information, for example.

FIG. 17 is a diagram of an exemplary correspondence relation between items that have not been approved in the approval examination of the created program and items to be automatically reinput as the application information at the time of reexamination.

In FIG. 17, pieces of application information I1, I2, I3, I4, and I5 represent pieces of application information input via the input unit 13 in the terminal device 10. It is assumed as an example that the application information I1 is "an icon image representing the created program," the application information I2 is "the created program main body," the application information I3 is "text information on specifications," the application information I4 is "an icon image representing operation contents," and the application information I5 is "text information on contents description." The application information I4 may be text information such as a character string or a numeric string described in a data description language such as JSON.

On the other hand, in FIG. 17, failed items A1, A2, A3, A4, and A5 represent items that have not been approved in the approval examination of the created program. It is assumed as an example that the failed item A1 is "the absence or deficiency of input of each item of the application information required for application," the failed item A2 is "Lack of support functions such as a help function and preparedness for version upgrades," the failed item A3 is "inconformity of metadata such as capacity, file attribute, and program configuration," the failed item A4 is "inconformity in moral, antisocial, and public moral points of view such as contents' not deviating from social knowledge," and the failed item A5 is "inconformity in quality such as the presence of bugs, a lengthy period of time to start up, and freezing." Typically, the failed items A1 and A2 do not require any revisions or the like of the created program body and thus correspond to relatively minor items as failed items. The failed item A3 corresponds to an item with the possibility that the contents of the created program will substantially change. The failed item A4 corresponds to an item estimated to be extremely low in possibility of reapplication and to be extremely low in possibility of being approved even by reexamination. The failed item A5 corresponds to an item requiring the created program to be fundamentally re-created because of lack of ability to create a computer program.

In the example in FIG. 17, the processing unit 24, when the created program has not been approved by the failed items A1 and A2, executes processing to automatically reinput all the items of the pieces of application information I1, I2, I3, I4, and I5 in the application screen for reexamination displayed on the display 14a of the terminal device 10.

The processing unit 24, when the created program has not been approved by the failed item A3, executes processing to automatically reinput only pieces of application information I1 and I4 out of the pieces of application information I1, I2, I3, I4, and I5 in the application screen for reexamination displayed on the display 14a of the terminal device 10.

Further, the processing unit 24, when the created program has not been approved by the failed item A4, does not automatically reinput any of the pieces of application information I1, I2, I3, I4, and I5 in the application screen for reexamination displayed on the display 14a of the terminal device 10.

The processing unit 24, when the created program has not been approved by the failed item A5, executes processing to automatically reinput only the application information I1 out of the pieces of application information I1, I2, I3, I4, and I5 in the application screen for reexamination displayed on the display 14a of the terminal device 10.

As in the foregoing, in the example in FIG. 17, the processing unit 24 automatically reinputs a relatively large number of pieces of application information when the created program has not been approved by any failed item with a relatively low degree of importance and, on the other hand, automatically reinputs a relatively small number of pieces of application information when the created program has not been approved by any failed item with a relatively high degree of importance.

The program management system Sys1, the external device 20, and the terminal device 10 according to the modification described in the foregoing, even when the created program has not been approved once, automatically reinputs the application information in accordance with the item that has not been approved and can thereby reduce time and effort of reapplication and reduce troublesomeness.

In this connection, the program management system Sys1, the external device 20, and the terminal device 10 can change the amount and item of the application information to be automatically reinput in accordance with the contents of the item that has not been approved. With this operation, the program management system Sys1, the external device 20, and the terminal device 10, when the degree of importance of the item that has not been approved is high to give a high possibility that the contents of the created program will be substantially changed, reduce the amount to be automatically reinput or adjust the item to be automatically reinput to prevent a case in which time and effort rather increase because of being automatically reinput, for example.

Consequently, the program management system Sys1, the external device 20, and the terminal device 10 can automatically input items other than an item for which the application information is predicted to be changed for reapplication in accordance with the item that has not been approved, can thus reduce time and effort for reapplication and reduce troublesomeness, and can consequently prevent a reduction in a willingness to create a computer program, for example.

The correspondence relation between the items that have not been approved in the approval examination of the created program and the items to be automatically reinput as the application information at the time of reexamination is not limited to the combination exemplified in FIG. 17. Similarly, the contents of the application information and the contents of the failed items are not limited to those described above either.

The program management system, the external device, and the terminal device according to the present embodiment may be formed by combining the components of the embodiment and the modification described in the foregoing as appropriate.

The program management system, the external device, and the terminal device according to the present invention transmit a computer program created by the terminal device to the external device and store the computer program transmitted from the terminal device to the external device in the external device. The program management system causes the external device to execute the processing to give approval to the computer program and stores the appropriateness of approval of the computer program as the first status information together with the computer program in the external device. The external device manages the computer program based on the first status information. Consequently, the program management system, the external device, and the terminal device can appropriately manage the computer program created by the terminal device by the external device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A program management system comprising:
a terminal device having a terminal processing unit capable of executing processing to create a computer program, and a terminal communication unit capable of transmitting the computer program created by the terminal processing unit to outside devices; and
an external device having an external device storage unit storing therein the computer program transmitted from the terminal device, and an external device processing unit capable of executing processing to give approval to the computer program stored in the external device storage unit,
wherein the computer program stored in the external device storage unit includes an approved computer program and a disapproval computer program,
wherein the computer program includes a plurality of block programs and an application program that is a combination of the block programs,
wherein the external device storage unit stores therein appropriateness of the approval of the computer program as first status information and information representing a degree of publication of the computer program to the outside as second status information together with the computer program,
wherein the external device processing unit is capable of executing processing to manage the computer program based on the first status information,
wherein the external device processing unit is capable of executing processing to publish the computer program to the outside based on the first status information and the second status information, and
wherein the external device processing unit is capable of changing the second status information of both the approved computer program and the disapproval computer program to a status information to limit publication and download of said programs in accordance with an update of the second status information of at least one of the plurality of block programs to the status information to limit publication and download of said programs and to transmit the updated second status information to the outside devices,
whereby the status of the approved computer program in the outside devices is changed according to a limited publication, and
whereby said outside devices can display said changed status to a user.

2. The program management system according to claim 1, wherein the terminal device has a terminal display unit that is controlled by the terminal processing unit and is capable of displaying images, wherein the terminal processing unit causes the terminal display unit to display an image representing the computer program and a first status image representing the first status information of the computer program.

3. The program management system according to claim 1, wherein the external device processing unit, when the first status information or the second status information is updated, is capable of executing processing to limit publication of the computer program that has been published to the outside based on update contents of the first status information or the second status information.

4. The program management system according to claim 3, wherein the external device processing unit, after executing the processing to limit publication of the computer program, is capable of executing processing to limit use of the computer program for a device that has already stored therein the computer program.

5. The program management system according to claim 3, wherein the external device processing unit, after executing the processing to limit publication of the entire computer program, is capable of executing processing to notify a device, which has already stored therein the entire computer program, of limitation of use of the computer program.

6. A program management system comprising:

a terminal device having a terminal processing unit capable of executing processing to create a computer program, and a terminal communication unit capable of transmitting the computer program created by the terminal processing unit to an outside; and an external device having an external device storage unit storing therein the computer program transmitted from the terminal device, and an external device processing unit capable of executing processing to give approval to the computer program stored in the external device storage unit, wherein the external device storage unit stores therein appropriateness of the approval of the computer program as first status information together with the computer program, and wherein the external device processing unit is capable of executing processing to manage the computer program based on the first status information, wherein the external device storage unit stores therein the computer program together with second status information representing a degree of publication of the computer program to the outside, wherein the external device processing unit is capable of executing processing to publish the computer program to the outside based on the first status information and the second status information, wherein the external device processing unit, when the first status information or the second status information is updated, is capable of executing processing to limit publication of the computer program that has been published to the outside based on update contents of the first status information or the second status information, wherein the external device processing unit, after executing the processing to limit publication of the computer program, is capable of executing processing to notify a device that has already stored therein the computer program of limitation of use of the computer program, and wherein the external device processing unit, after executing the processing to notify a device that has already stored therein the computer program of limitation of use of the computer program, is capable of executing processing to present to the device a computer program as an alternative to the computer program that has been limited in use.

7. The program management system according to claim 1, wherein the external device storage unit stores therein the entire computer program together with third status information representing charging contents of the computer program, and the external device processing unit is capable of executing processing to enable the entire computer program to be downloaded based on the first status information and the third status information.

8. The program management system according to claim 1, wherein the external device storage unit stores therein the computer program together with fourth status information representing a use status of the entire computer program, and the external device processing unit is capable of executing processing to calculate a reward for the computer program based on the fourth status information.

9. The program management system according to claim 1, wherein the external device storage unit stores therein the entire computer program together with fifth status information representing a user who is able to use the computer program, and the external device processing unit is capable of executing processing to enable the entire computer program to be downloaded by the user, based on the first status information and the fifth status information.

10. The program management system according to claim 9, wherein the external device processing unit is capable of executing processing to notify a device associated with the user who is able to use the computer program of availability of the entire computer program based on the fifth status information.

11. The program management system according to claim 10, wherein the external device processing unit, after executing the processing to notify the device associated with the user who is able to use the computer program of availability of the entire computer program, is capable of executing processing to download the entire computer program to the device when an operation to accept use of the computer program is performed in the device.

12. The program management system according to claim 1, wherein the terminal communication unit transmits to the external device the entire computer program together with application information input to the terminal device, and wherein the external device processing unit is capable of executing processing, when the entire computer program has not been approved, to change an item to be automatically re-input in the terminal device as the application information in accordance with an item that has not been approved.

13. The program management system according to claim 1, wherein
the computer program comprises:
(1) a service block program defining output information output by a device to be operated,
(2) a trigger block program defining contents of a trigger invoking an action for outputting the output information, and a trigger generation unit generating the trigger to cause the trigger generation unit to generate the trigger,
(3) an action block program defining contents of the action and an action execution unit executing the action to cause the action execution unit to execute the action, or
(4) an application program that is a combination of the service block program, the trigger block program, and the action block program.

14. An external device comprising:
an external device communication unit capable of receiving, from a terminal device creating a computer program and capable of transmitting the created computer program to outside devices, the computer program transmitted from the terminal device;
an external device storage unit storing therein the computer program transmitted from the terminal device and received by the external device communication unit; and
an external device processing unit capable of executing processing to give approval to the computer program stored in the external device storage unit,
wherein the computer program stored in the external device storage unit includes an approved computer program and a disapproval computer program,
wherein the computer program includes a plurality of block programs and an application program that is a combination of the block programs,
wherein the external device storage unit stores therein appropriateness of the approval of the computer program as first status information and information representing a degree of publication of the computer program to the outside as second status information together with the computer program,
wherein the external device processing unit is capable of executing processing to manage the computer program based on the first status information,
wherein the external device processing unit is capable of executing processing to publish the computer program to the outside based on the first status information and the second status information, and
wherein the external device processing unit is capable of changing the second status information of both the approved computer program and the disapproval computer program to a status information to limit publication and download of said programs in accordance with an update of the second status information of at least one of the plurality of block programs to the status information to limit publication and download of said programs and to transmit the updated second status information to the outside,
whereby the status of the approved computer program in the outside devices is changed according to a limited publication, and
whereby said outside devices can display said changed status to a user.

15. A terminal device comprising:
a terminal processing unit capable of executing processing to create a computer program; and
a terminal communication unit capable of transmitting the computer program created by the terminal processing unit to outside devices,
wherein the terminal device transmits the computer program requiring approval from the terminal communication unit to an external device, the external device having an external device communication unit capable of receiving the computer program transmitted from the terminal communication unit, an external device storage unit storing therein the computer program received by the external device communication unit, and an external device processing unit capable of executing processing to give the approval to the computer program stored in the external device storage unit, and the external device is capable of executing processing to manage the computer program based on first status information representing appropriateness of the approval,
wherein the computer program stored in the external device storage unit includes an approved computer program and a disapproval computer program,
wherein the computer program includes a block program and an application program that is a combination of the block programs,
wherein the external device storage unit stores therein appropriateness of the approval of the computer program as first status information and information representing a degree of publication of the computer program to the outside as second status information together with the computer program,
wherein the external device processing unit is capable of executing processing to manage the computer program based on the first status information,
wherein the external device processing unit is capable of executing processing to publish the computer program to the outside based on the first status information and the second status information, and
wherein the external device processing unit is capable of changing the second status information of both the approved computer program and the disapproval computer program to a status information to limit publication and download of said programs in accordance with an update of the second status information of at least one of the plurality of block programs to the status information to limit publication and download of said programs and to transmit the updated second status information to the outside,
whereby the status of the approved computer program in the outside devices is changed according to a limited publication, and
whereby said outside devices can display said changed status to a user.

\* \* \* \* \*